(12) United States Patent
Mealey

(10) Patent No.: US 9,148,475 B1
(45) Date of Patent: Sep. 29, 2015

(54) NAVIGATION CONTROL FOR NETWORK CLIENTS

(71) Applicant: Pleenq, LLC, Chula Vista, CA (US)

(72) Inventor: Justin Mealey, Chula Vista, CA (US)

(73) Assignee: Pleenq, LLC, Chula Vista, CA (US)

( * ) Notice: Subject to any disclaimer, the term of this patent is extended or adjusted under 35 U.S.C. 154(b) by 0 days.

(21) Appl. No.: 14/557,064

(22) Filed: Dec. 1, 2014

(51) Int. Cl.
*G06F 15/16* (2006.01)
*H04L 29/08* (2006.01)
*H04L 29/06* (2006.01)
*G06F 17/30* (2006.01)
*G06Q 30/02* (2012.01)
*G06Q 30/06* (2012.01)

(52) U.S. Cl.
CPC .......... *H04L 67/10* (2013.01); *G06F 17/30867* (2013.01); *H04L 67/42* (2013.01); *G06Q 30/02* (2013.01); *G06Q 30/0241* (2013.01); *G06Q 30/0601* (2013.01); *G06Q 30/0643* (2013.01)

(58) Field of Classification Search
CPC .............. G06Q 30/0643; G06Q 30/02; G06Q 30/0241; G06Q 30/0601
USPC .................................. 709/200–205, 217–227
See application file for complete search history.

(56) References Cited

U.S. PATENT DOCUMENTS

| | | | |
|---|---|---|---|
| 6,108,703 A | | 8/2000 | Leighton et al. |
| 6,119,135 A | * | 9/2000 | Helfman .................... 715/206 |
| 6,334,111 B1 | * | 12/2001 | Carrott ...................... 705/14.39 |
| 8,145,542 B2 | | 3/2012 | Kahle et al. |
| 8,244,069 B1 | | 8/2012 | Bourdev |
| 8,423,536 B2 | * | 4/2013 | Lieske et al. .................. 707/722 |
| 8,676,789 B2 | * | 3/2014 | Lieske et al. .................. 707/722 |
| 8,700,447 B2 | * | 4/2014 | Chappell et al. ........... 705/14.45 |
| 8,713,009 B2 | | 4/2014 | Walker et al. |
| 8,732,030 B2 | * | 5/2014 | Gokturk et al. .............. 705/26.1 |
| 8,863,262 B2 | * | 10/2014 | Samatov ........................... 726/8 |
| 2001/0011365 A1 | * | 8/2001 | Helfman ........................... 717/1 |
| 2005/0289026 A1 | * | 12/2005 | Dunn et al. ..................... 705/30 |
| 2009/0228366 A1 | * | 9/2009 | Biris et al. ...................... 705/26 |
| 2012/0179520 A1 | * | 7/2012 | Vailaya et al. ............... 705/14.4 |
| 2013/0007271 A1 | * | 1/2013 | Stout et al. .................... 709/224 |
| 2013/0129142 A1 | | 5/2013 | Miranda-Steiner |
| 2013/0311460 A1 | * | 11/2013 | Lieske et al. ................. 707/724 |

\* cited by examiner

*Primary Examiner* — Moustafa M Meky

(74) *Attorney, Agent, or Firm* — Knobbe Martens Olson & Bear LLP

(57) ABSTRACT

Methods and apparatus for controlling navigation behavior in a computer network include an object creation node, an object navigation node, and an object server node. The object creation node may define objects in images that are associated with network resources. The object server node stores the objects and associated network resources. When an image containing an object is retrieved by an object navigation node, the object server node sends a definition of the object and a network resource identifier to the object navigation node. The object navigation node can access the network resource using the received network resource identifier when interacting with the object.

9 Claims, 19 Drawing Sheets

NAVIGATION CONTROL FOR NETWORK CLIENTS

BACKGROUND

1. Field

Certain aspects of the present disclosure generally relate to client navigation behavior in a computer network, and more particularly, to methods and apparatus for image based control of navigation of a second client computer through a first client computer.

2. Background

Web browsers navigate across different network resources of the Internet by loading an initial web page into the browser that contains links to other web pages. Interacting with a link retrieves the linked web page, from which additional links become available.

Links are made part of a web page by the authors of the web pages, and that syntax is hosted on web servers operated by the owners and operators of the web sites with which the web pages are associated. Tools exist for Internet users that are not web programmers to create and modify web page content for viewing by others (e.g. posting images or other information on a user's Facebook or LinkedIn web page), however, there is currently no facility available for Internet users to insert links into web pages authored by others.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus comprising a server in communication over a network with at least a first and a second client, the server being configured for providing the first client with control over at least some aspects of network resource navigation behavior of the second client. The server comprises a database having stored therein data identifying at least a first image, data defining a region of the first image, wherein the region of the first image is selected at the first client and is received by the server from the first client, and a network resource identifier stored in association with the data defining the region of the first image. The server also comprises a navigation controller configured to control the navigation behavior of the second client using the data defining the region of the first image and the associated network resource identifier. When the second client accesses the first image from a node of the computer network, the navigation controller is configured to send data defining the region of the first image to the second client, and send the network resource identifier that is stored in the database in association with the data defining the region of the first image to the second client.

Another aspect of the disclosure provides a method, in a computer network having a first client, a second client, and a server, for executing image based navigation behavior at a second client as defined by a first client. The method comprises downloading one or more images to the second client from one or more nodes of the computer network, sending, from the second client to the server, data identifying at least a first image of the one or more images, receiving, from the server, data defining a region of the first image that was previously selected by the first client, receiving, from the server, a network resource identifier, generating a link using the data defining a region of the first image that was previously selected by the first client and the network resource identifier, and accessing the network resource associated with the network resource identifier by interacting with a link identifier associated with the link.

Another aspect of the disclosure provides a method, in a computer network having a first client, a second client, and a server, for defining image based navigation behavior for a second client at a first client. The method comprises downloading one or more images to the first client from one or more nodes of the computer network, selecting a first image from the one or more downloaded images, selecting a region of the first image, selecting a network resource; and sending, from the first client to the server, data defining the selected region of the first image and data defining the selected network resource.

Another aspect of the disclosure provides a system for controlling navigation in a computer network. The system comprises an object creation node configured to generate definitions of image regions, an object navigation node configured to navigate among a series of web pages, and a server configured to provide control over at least some navigation behavior of the object navigation node in accordance with image regions defined by the object creation node. The server is configured to send, to the object navigation node, one or more definitions of image regions generated by the object creation node, and to also send, to the object navigation node, network resource locators that are associated in the server with the one or more image regions defined by the object creation node.

DETAILED DESCRIPTION

Figure 1A:
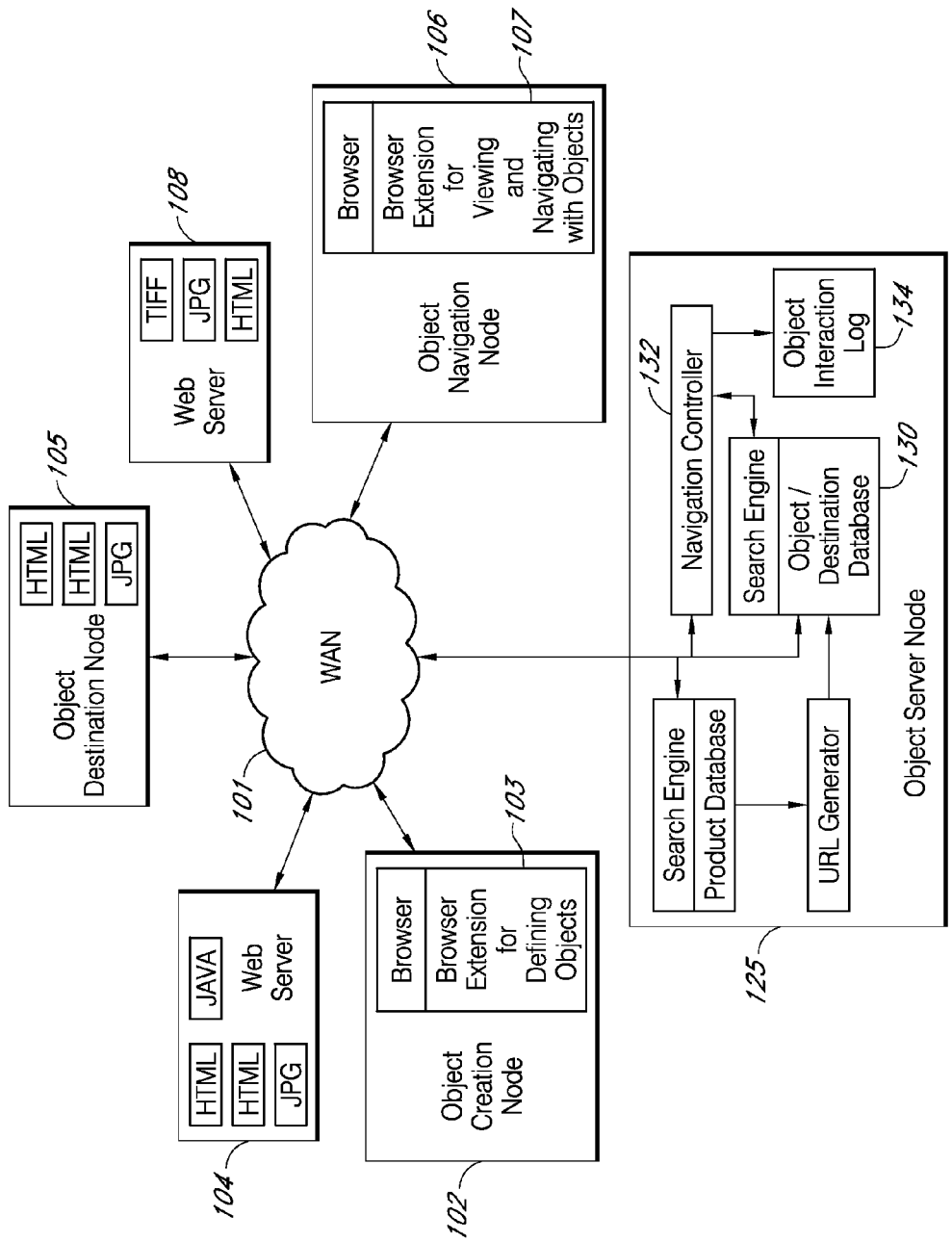
FIG. 1A is a diagram of an exemplary networked communication system in accordance with embodiments described herein.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

DEFINITIONS

Browser and Web Page: A browser is a computer program that provides functionality to a computer for executing syntax contained in web pages. The computer may be connected to a computer network, and the network may be, and usually will be, the Internet. As used herein, browsers and web pages together provide functionality to a computer connected to a network (e.g. the Internet) at least sufficient to request, retrieve, and display at least some network resources including web pages themselves, and to execute at least some links contained within or referred to in retrieved web pages to retrieve other web pages specified with the links. Browsers may operate together with browser extensions, and in this case, the combination may be referred to herein as a browser, without specific additional mention of the browser extension. Web pages may include references such as URLs to other network resources that contain images or other data that is retrieved by the browser from the network or a cache memory when executing the web page, and may also include references to programs, libraries, style sheets, scripts, and the like which are called by the browser when executing the web page. Some of these items may require prior separate loading onto the computer (e.g. Flash and a Java Virtual Machine). Any of these items that are accessed, used, and/or retrieved during browser execution of web page syntax are considered to be included as a component of the "web page" as that term is used herein. Examples of browsers include Internet Explorer distributed by Microsoft, and Chrome distributed by Google. Example web page syntax that can be executed by browsers is the various versions of HyperText Markup Language (HTML) promulgated by the World Wide Web Consortium (W3C).

Browser Extension: A computer program that adds functionality to a browser, but is distributed separately from the browser to which it adds that functionality. Popular browser programs such as Internet Explorer and Chrome provide internal functionality allowing them to interact with browser extensions distributed by third parties as long as the third-party browser extension complies with the interface for browser extensions provided with the browser. The functionality provided by a browser extension may include modifications to browser execution of retrieved web pages. Some currently available browser extensions perform functions such as displaying and executing toolbar functions on top of retrieved web pages, or blocking browser retrieval of advertisements that would otherwise be downloaded in conjunction with web page execution.

Server: Processing hardware coupled to a computer network having network resources stored thereon that is configured with software to respond to client access requests to use or retrieve the network resources stored on the server.

Internet: The globally interconnected system of computers and computer networks that evolved from ARPANET and NSFNET over the late 1980s and early 1990s that may utilize TCP/IP network communication protocols.

Network Resource Identifier: A definition of a network resource (e.g. by storage location and filename) that is used by client computers to specify a network resource in access requests issued to the network by the client computers. A network resource identifier may also be referred to as a location of a network resource such as an image or a web page. Currently, when the network is the Internet, Network resource identifiers are known as URLs (an acronym for Uniform Resource Locator) that are formatted in accordance with RFC 3986 of the Internet Engineering Task Force (IETF). For the purposes of this disclosure, any format for specifying a network resource in client access requests issued to a network is within the definition of the term Network Resource Identifier. A network resource identifier, including URLs as currently defined on the Internet, may further include data in addition to data identifying the network resource that a server hosting the network resource associated with the network resource identifier may use for other purposes beyond identifying the requested network resource.

Web Site: A collection of network resources including at least some web pages that share a common network resource identifier portion, such as a set of web pages with URLs sharing a common domain name but different pathnames.

Web Server: A server that includes functionality for responding to requests issued by browsers to a network, including, for example, requests to receive network resources such as web pages. Currently, browsers and web servers format their requests and responses thereto in accordance with the HyperText Transfer Protocol (HTTP) promulgated by the IETF and W3C.

World Wide Web: The collection of web pages stored by and accessible to computers running browsers connected to the Internet that include references to each other with links.

Link: Syntax that instructs a browser executing the syntax to access a network resource defined directly or indirectly by the syntax. The link syntax and/or internal browser functionality may also define conditions under which the access request is made by the browser, for example through cursor position and/or other interaction with an I/O device such as a keyboard or mouse. Some link syntax may cause the browser to access the specified network resource automatically while processing the syntax without user prompt or interaction. Links include HTML hyperlinks. A link may be directly coded with, for example, HTML tags and an explicit URL, or may be in the form of a script or other called function defined in a browser, in a browser extension, and/or in a webpage.

Link Indicator: A visible indication generated by the browser under the control of link syntax and/or browser functionality indicating the presence of a link in a web page being executed by the browser. Currently, commonly used examples of visible indications of links include text of specific colors, underlining, and changes in visual appearance of displayed icons. The visible indication may change or be dependent on cursor position or other aspects of the user interaction with the browser.

Network Resource: A web page, file, document, program, service, or other form of data or instructions which is stored on a network node and which is accessible for retrieval and/or other use by other network nodes.

Redirection Response: A response that may be provided by a server when processing an access request of a client for a network resource, where the response includes a network resource identifier of a different network resource that the client should access for the desired information or action. In the HTTP protocol, a redirection response may also include a 303 status code, and the client receiving the redirection response may then send a GET or other request for the network resource identified by the URL provided in the response.

Navigate: Controlling a browser so as to use a series of links to access a series of network resources.

Referring now to FIG. 1A, a networked set of computers includes a server 125, referred to herein as an "object server node," that is connected to and part of a wide area network (WAN) 101 which may be the Internet. The object server node 125 may comprise general purpose processing hardware and may be a single computer or may be distributed among multiple different computers. The object server node 125 generates and/or stores therein network resource identifiers that are selectively delivered to other network nodes by the object server node 125 as described in further detail below.

The object server node 125 communicates with nodes 102 coupled to and part of the network 101 that execute what is referred to herein as "object creation" software 103. These network connected nodes 102 are referred to herein as "object creation nodes" and may be general purpose computing devices such as personal desktop computers, laptop computers, smart phones, or any other general or special purpose processing hardware that is configured to communicate over a WAN such as the Internet. Although only one object creation node 102 is shown in FIG. 1, the system may include many object creation nodes 102.

In conjunction with the object server node 125, the object creation software executing on the object creation nodes 102 empowers an operator of an object creation node 102 to define "objects," described further below, that are associated with web pages and/or components thereof retrieved by the object creation node 102 over the network 101, for example from web servers 104 and/or 108 of FIG. 1A. These defined objects are associated with network resources available on other nodes of the network such as object destination node 105 of FIG. 1A. As described further below, with the object server node 125, objects and their associated network resources as defined by an operator of an object creation node 102 can later be forwarded to and used by other Internet users (such as the object navigation nodes 106 described further below) to direct them to network resources stored on object destination node 105 in accordance with the associations between objects and network resources defined at the object creation node 102.

The object server node 125 may also communicate with other network connected nodes 106 that run what is referred to herein as "object navigation" software 107, and these network connected nodes 106 are referred to herein as "object navigation nodes." In conjunction with the object server node 125, the object navigation software running on the object navigation nodes 106 empowers operators of the object navigation nodes 106 to view and interact with objects defined by object creation nodes 102 when the object navigation nodes 106 retrieve the web pages or portions thereof from, for example web servers 104 and/or 108 that have previously been associated with objects defined by the object creation nodes 102. Although only one object navigation node 106 is shown in FIG. 1A, the system may include many object navigation nodes 106.

As described further below, interaction with these objects at an object navigation node 106 allows the object navigation node 106 to use network resource identifiers such as URLs generated and/or stored by the object server node 125 to navigate to the object destination node 105 where network resources associated with objects are stored.

The object creation software 103 and the object navigation software 107 may both be present on a given node of the network, such that at least some, and usually most or all network nodes that are object creation nodes 102 are also object navigation nodes 106 and vice versa. As illustrated in FIG. 1A, the object creation software 103 and/or the object navigation software 107 may comprise, include, or be a browser extension that operates in conjunction with browsers executing on the object creation nodes 102 and object navigation nodes 106.

As described in more detail below, the object server node 125 receives and stores object parameters for objects created by object creation nodes 106, delivers object parameters to the object navigation nodes 106, and when object navigation nodes 106 interact with those objects, the object server node 125 delivers the appropriate URLs to the object navigation nodes 106 to direct them to access the appropriate network resource of the object destination node 105.

In some implementations of the system, the objects created by the object creation nodes 106 comprise regions of images retrieved by the object creation nodes 102, where the region of the image that forms the object is selected by the operator of the object creation node 102 using the object creation software 103. Under the control of the object server node 125, an image region forming an object as defined by an object creation node 102 can be converted to a link and link indicator in a web page that contains the same image when it is accessed by an object navigation node 106. This link can be used (directly or indirectly) by the object navigation node 106 to initiate navigating to the web page stored on the object destination node 105. Exemplary user interaction when performing these functions at the object creation node 102 and object navigation node 106 are illustrated in FIGS. 2-13.

Figure 2:
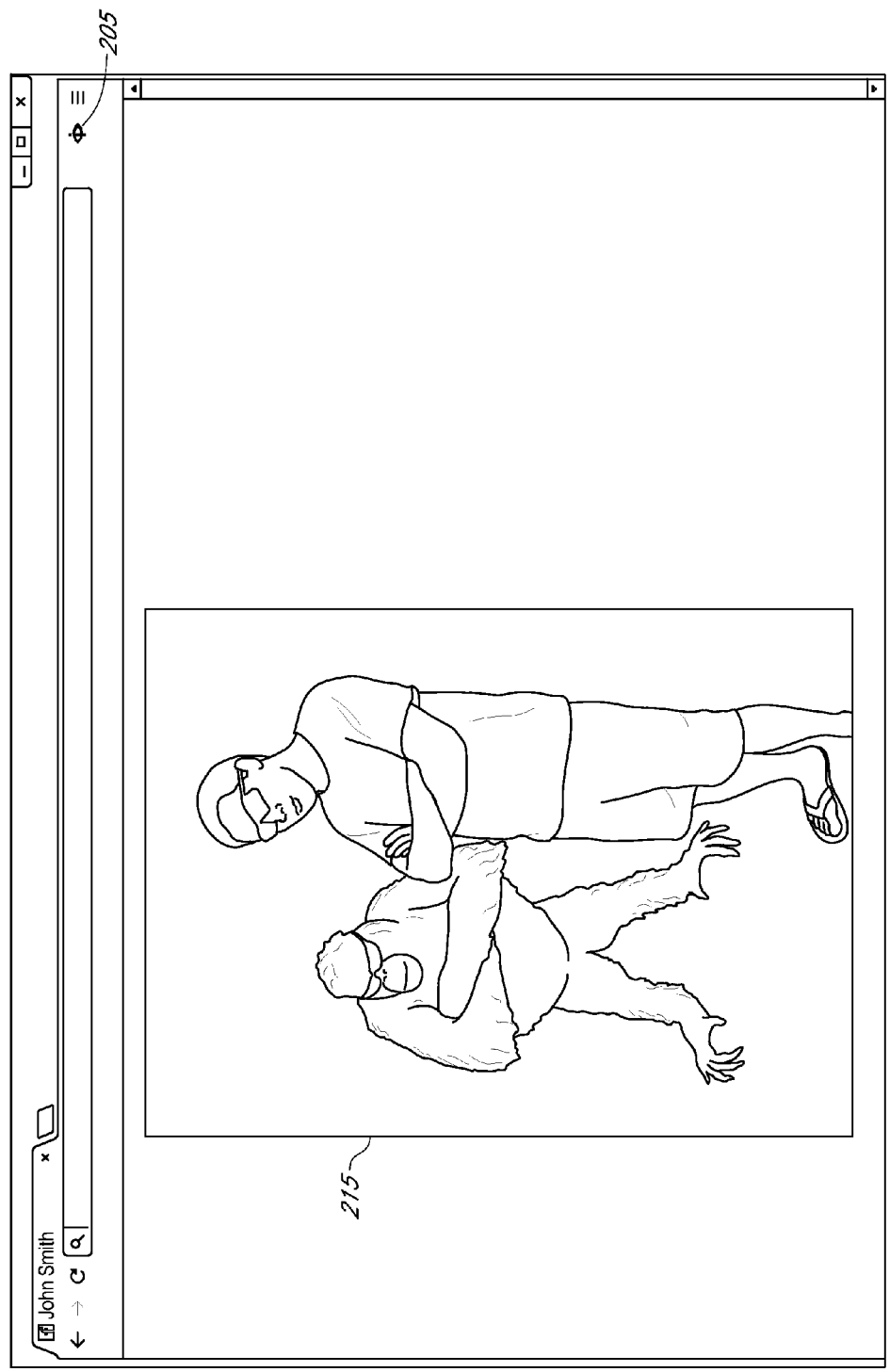
FIG. 2 is an exemplary screen display of a website containing an image.

FIG. 2 is an exemplary screen display of a web page retrieved by the object creation node 102 that contains several images, although only one is illustrated in FIG. 2. The retrieved web page could be a Facebook photo album web page for example, and may be retrieved from web server 104 for example by a browser running on the object creation node 102. Typically, when the network is the Internet as currently configured, the HTML code of such a retrieved web page will include URLs specifying the domain and pathnames of image files that are to be used by the browser as it assembles the display of the web page at the object creation node 102. These URLs are accessed by the browser as the web page is executed, and the specified images are retrieved by the browser using the URLs. It may be noted that the server where the images are stored may or may not be the same as the server from which the HTML code for the web page was retrieved. For example, the HTML code for the web page may be retrieved from web server 104, whereas an image to be retrieved when executing the HTML code may be stored on and retrieved from web server 108 when the browser assembles the display during web page execution.

Once the display for the web page is assembled by the browser and presented to the user, a user may access the functionality of the object creation software 103, which as described above, may be a browser extension operating as part of the browser on the object creation node 102. For example, FIG. 2 illustrates a browser extension icon 205 which may be used to initiate execution of object creation functionality when selected.

Figure 3:
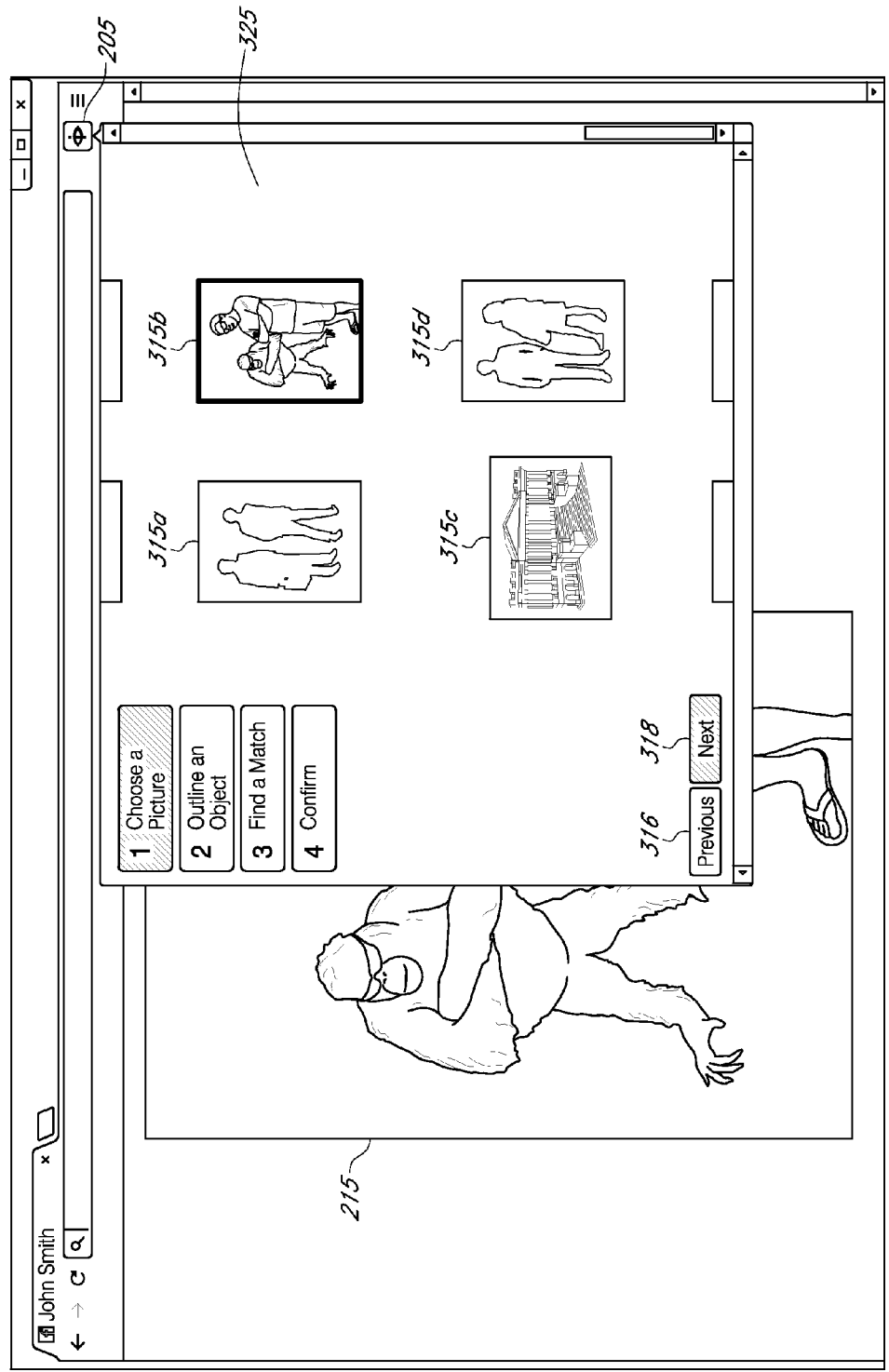
FIG. 3 is an exemplary screen display after a user has selected a browser extension icon which allows a user to define a region within an image.

FIG. 3 is an exemplary screen display after the user has selected the browser extension icon 205. As illustrated in FIG. 3, a pop-up window 325 may appear after the user clicks on the browser extension icon 205. The pop-up window 325 may include instructions for the user to define objects within an image and image thumbnails 315a-315d corresponding to the images retrieved by the browser when executing the web page. For web pages including many images, a scroll bar allows scrolling through the thumbnails. In this implementation, four fundamental steps are performed, and the pop-up window 325 may comprise navigation buttons 316, 318 for transitioning forward and backward between the steps as the user completes the steps or desires to go back and re-perform an earlier step.

The instructions first direct the user to choose a picture and a black border is created around a selected thumbnail 315b when the user, for example, clicks a mouse button with the cursor over the desired thumbnail 315b. The black border indicates that the user has selected image 215 to define objects within.

Figure 4:
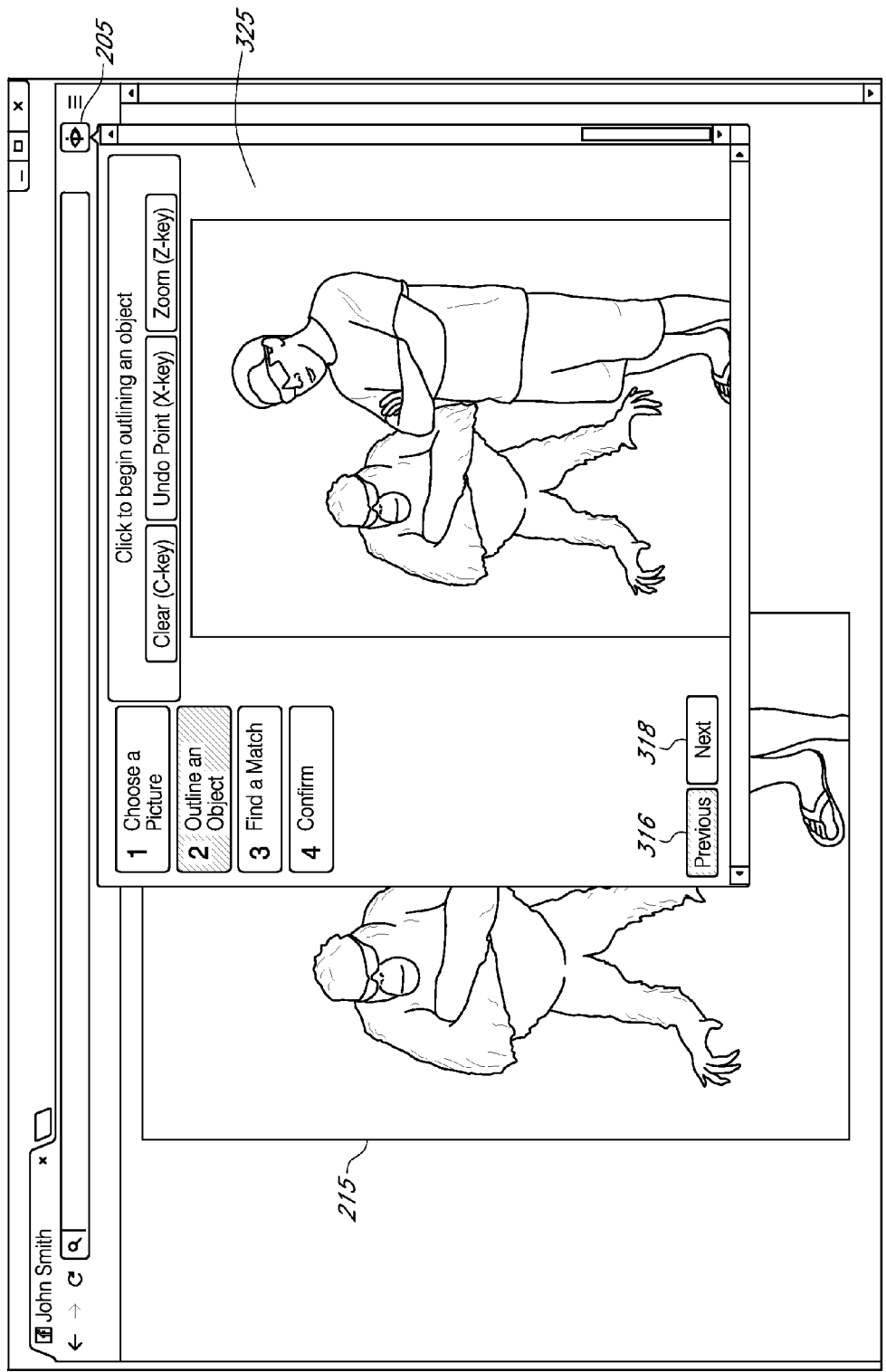
FIG. 4 is an exemplary screen display after the user has selected a desired image to define one or more regions within.

FIG. 4 is an exemplary screen display after the user has selected the desired image 215 to define objects within. In FIG. 4, the pop-up window 325 displays a larger view of the selected image 215 and provides instructions to the user to begin defining or outlining a region within the image. For example, the user may wish to define an object as the region of the image containing the sunglasses worn by the man in the image. To do this, the user may use a computer mouse or mouse pad to outline the region defining the object. For example, the user may select a starting point by clicking the mouse on a first (x,y) coordinate point in the image on the edge of the sunglasses. As the user then moves the cursor over the image, the screen may display a relatively thick and/or contrasting color line from the starting point selected to the current position of the cursor on the screen. Each subsequent click of the mouse creates a new point and the relatively thick and/or contrasting color connection line is maintained between each point selected. In this way, a user may continue outlining the region within the image defining the object until the user double clicks the mouse or otherwise indicates that the outline is complete. With this method, the (x,y) coordinate cursor position at the moment of each mouse click by the user can be stored to generate an ordered set of numerically defined locations within the image, and these numerical values can be parameters that define the "object" created by the user. In another embodiment, the user may click and hold the mouse down in order to draw the outline similar to a pen function. In this embodiment, the object creation software may periodically sample the (x,y) cursor position to generate a sequence of coordinate points along the outline as the user draws it to generate a set of numerical values that define the object. With a mouse, and especially with a touchscreen, a region could be filled in by the user instead of outlined and afterward a series of points along the edge of the filled in region could be generated by the object creation software to define the object. This process could also be assisted if image processing algorithms are included in the object creation software such as edge detection and space filling algorithms. These could be used to suggest regions of the image to the user, and/or smooth an outline or filled in area created by hand. As an alternative to defining the object with a series of coordinate points along the edge of a region, a list of all the pixel locations within the outline may be generated and stored. In a simple embodiment, a single point in the image at a desired location such as on or near the sunglasses may be selected by the user. In any of these cases, a series of numerical values can be generated and stored by the object creation software to define the object.

Figure 5:
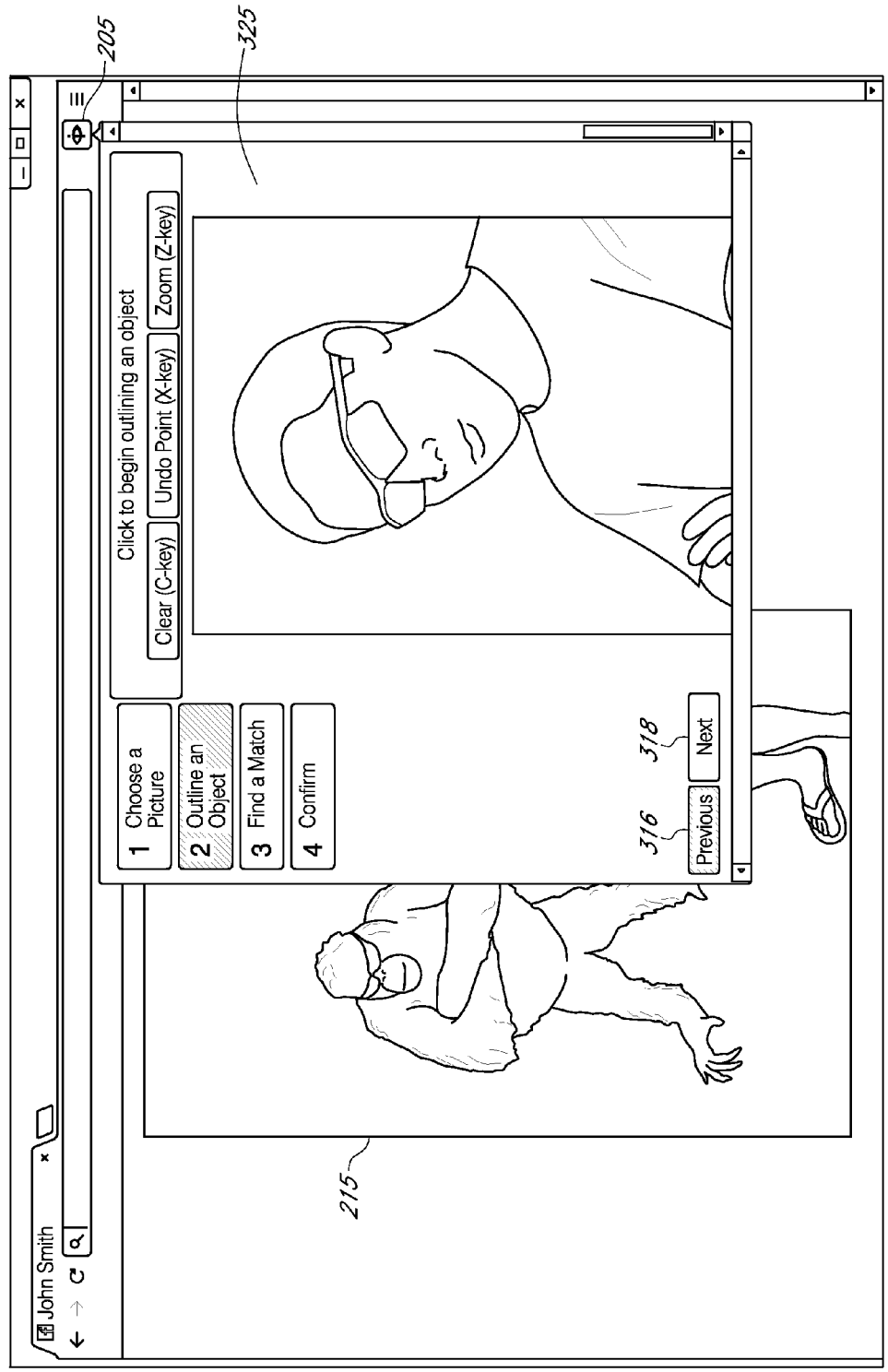
FIG. 5 is an exemplary screen display of a zoomed-in portion of the image of FIG. 4.
Figure 6:
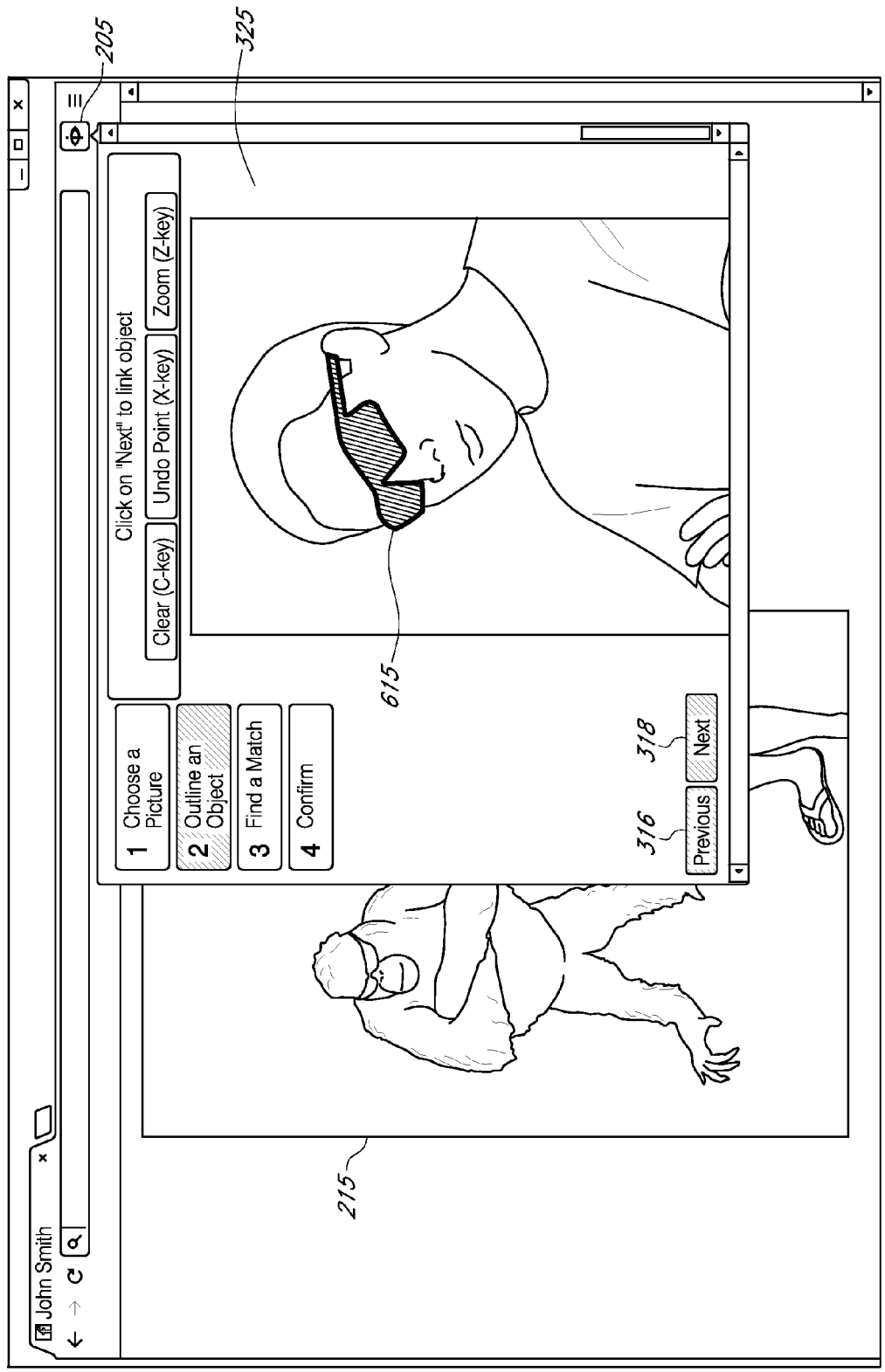
FIG. 6 is an exemplary screen display after the user has completed defining the region within the image.

During this process, it may be desirable for a user to be able to manipulate the image 215 (e.g., zoom, clear edits, or undo an action) in order to better define the region within the image. For example, as shown in FIG. 4, the pop-up window contains buttons and key commands (e.g., clear, undo point, and zoom) to aid the user in outlining an image region. FIG. 5 is an exemplary screen display of a zoomed-in portion of the image 215 of FIG. 4. In FIG. 5, the user has zoomed-in on the portion of the image containing the sunglasses on the man. FIG. 6 is an exemplary screen display of the image 215 with the outlined region of the image 215 highlighted by altering image pixel color inside the drawn border for user inspection and approval. The border of the highlighted region defines the area of the selected region 615 on the image 215. This highlighting may occur automatically when the user double clicks the mouse indicating they have completed defining the object 615.

Figure 7:
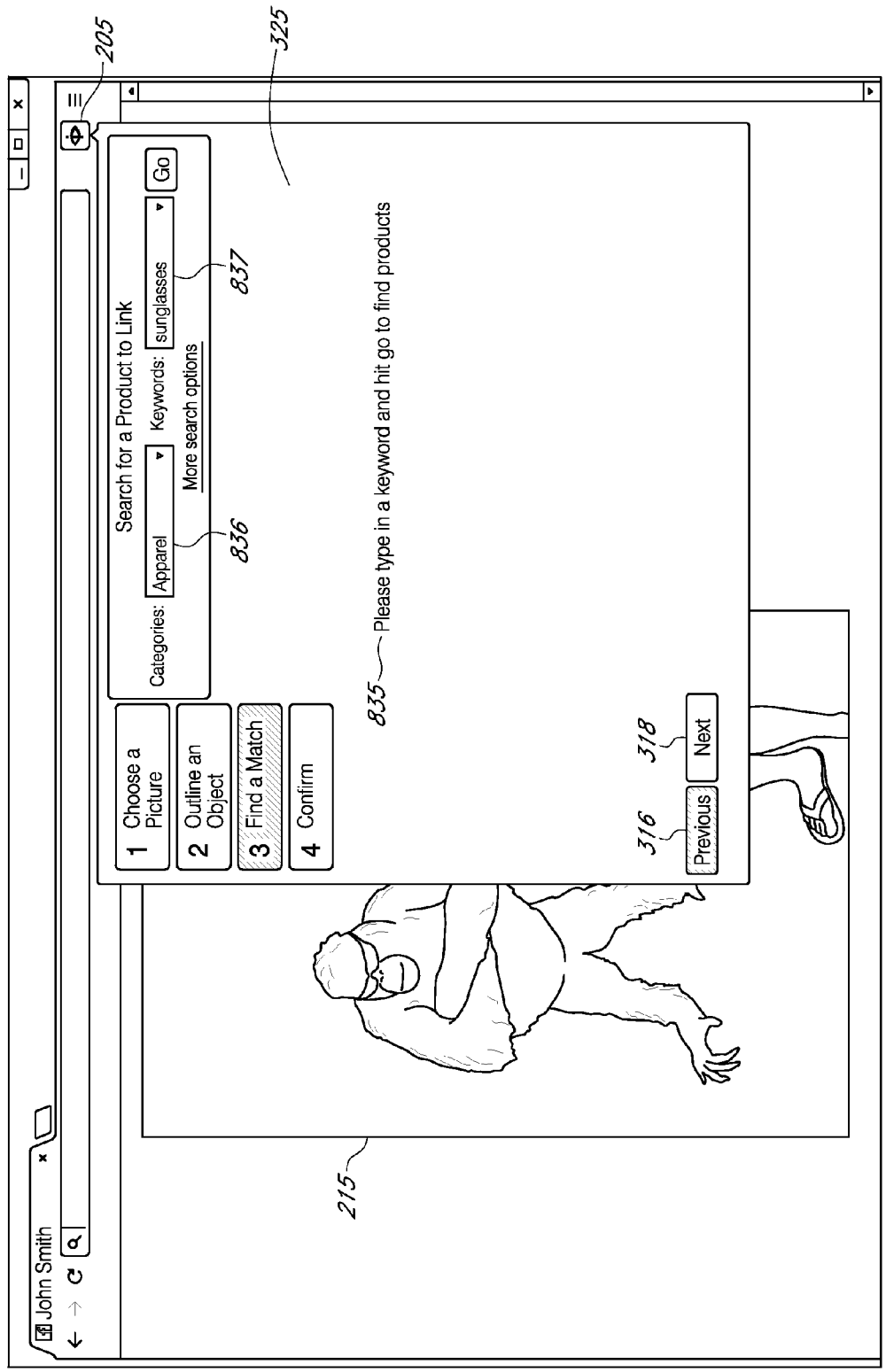
FIG. 7 is an exemplary screen display after the user has selected to continue to the next screen from FIG. 6.

The next step may comprise associating the object 615 defined within the image 215 with a network resource on another node of the network. FIG. 7 is an exemplary screen display after the user has selected the "Next" button 318 to continue to the next screen. In FIG. 7, the screen provides instructions 825 for the user to associate the object 615 defined in the previous screen with a physical item. As shown in FIG. 7, a user may select a category for the item from a drop-down menu 836 and/or type in a keyword in the keyword search box 837 for a desired item in order to aid the search. When the user clicks the "Go" button or hits the "Enter" key, the browser extension performs a search and displays the results.

Figure 8:
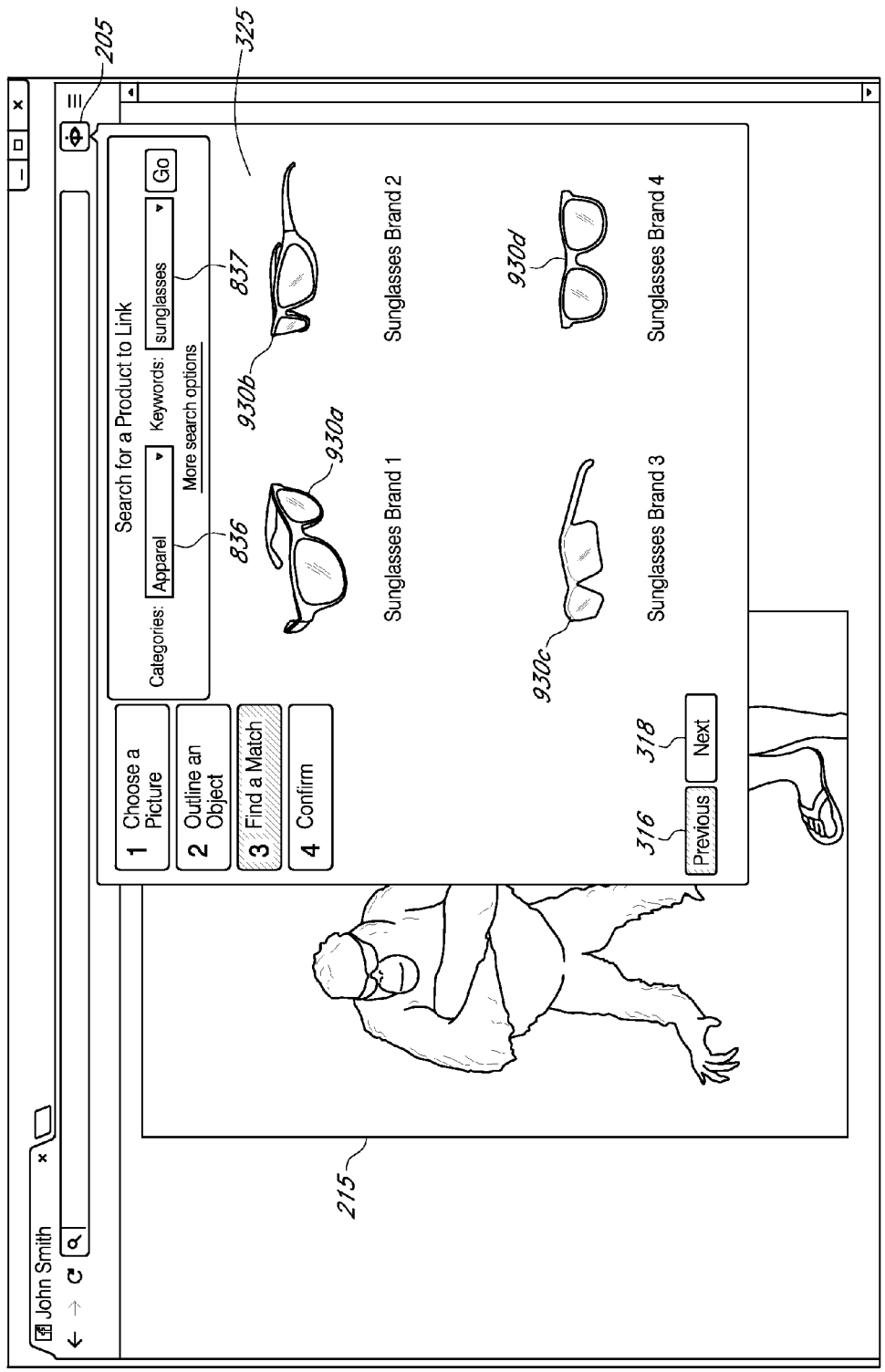
FIG. 8 is an exemplary screen display illustrating the search results from the search entered in FIG. 7.
Figure 9:
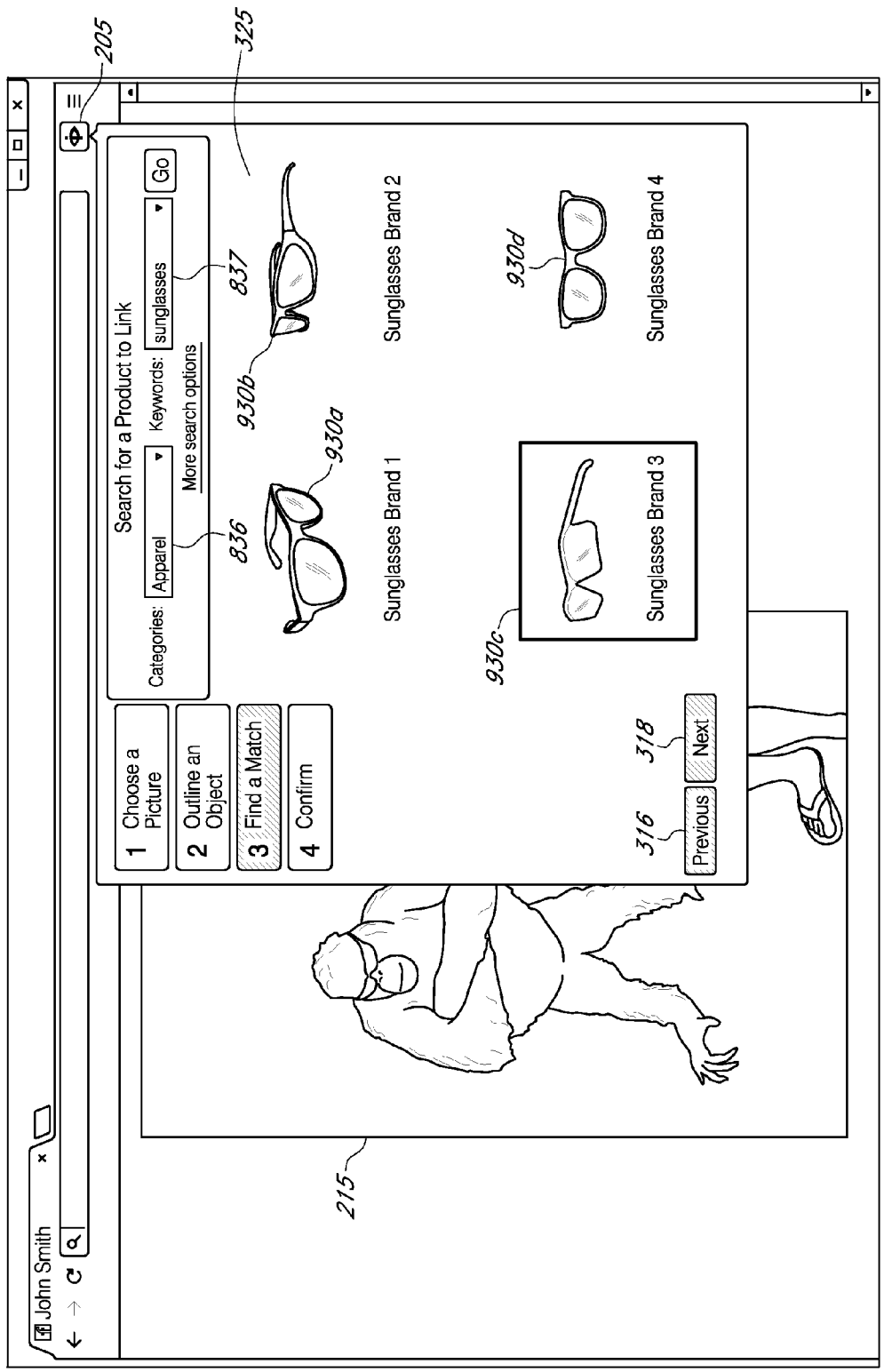
FIG. 9 is an exemplary screen display of a user selecting an item from the list of search results depicted in FIG. 8.

FIG. 8 is an exemplary screen display illustrating the search results from the search entered in FIG. 7. As shown in FIG. 7, the user has selected the category "Apparel" from the drop-down menu 836 and typed in the keyword "sunglasses" in the keyword search box 837. The search results returned based on the category and keywords selected may comprise a list of items and/or images of the items with a brief description of each item returned. In FIG. 8, a variety of images of different sunglasses (e.g., items 930a-930d) along with brief descriptions of each of the sunglasses are depicted. In some embodiments, the user may scroll through the search results in order to find a desired item to associate with the object 615 defined previously. In some embodiments, the browser extension may contain image processing software that can analyze the shape of the object 615, identify items that the shape likely corresponds to, and automatically perform a search for options to present to the user without a manual search.

To perform this search, the object creation software 103 may send the search query to the object server node 125. After receiving the search query from the object creation node 102, the object server node 125 may search a database it maintains locally, or it may perform a search of other web sites directly scraped or via external APIs to facilitate searching outside of the object server node 125. Alternatively, the object creation software 103 may be configured to leverage search engines operated separately from the object server node 125. The results of the search are sent from the object server node 125 to the object creation node 102 (or possibly retrieved by the object creation node from other nodes of the network) and displayed to the user by the object creation software. If the user is unable to find a desired item to associate with the object 615 from the search results, the user may retype a new search or the object creation software may have an option for the user to enter in more search criteria. For example, as shown in FIG. 8, a user may select the link entitled "more search options" in order to enter in more description for the search. If the user finds the correct item that the user wishes to associate with the object 615 that was defined, the user may select the item by clicking on the image of the item from the search results.

Figure 10:
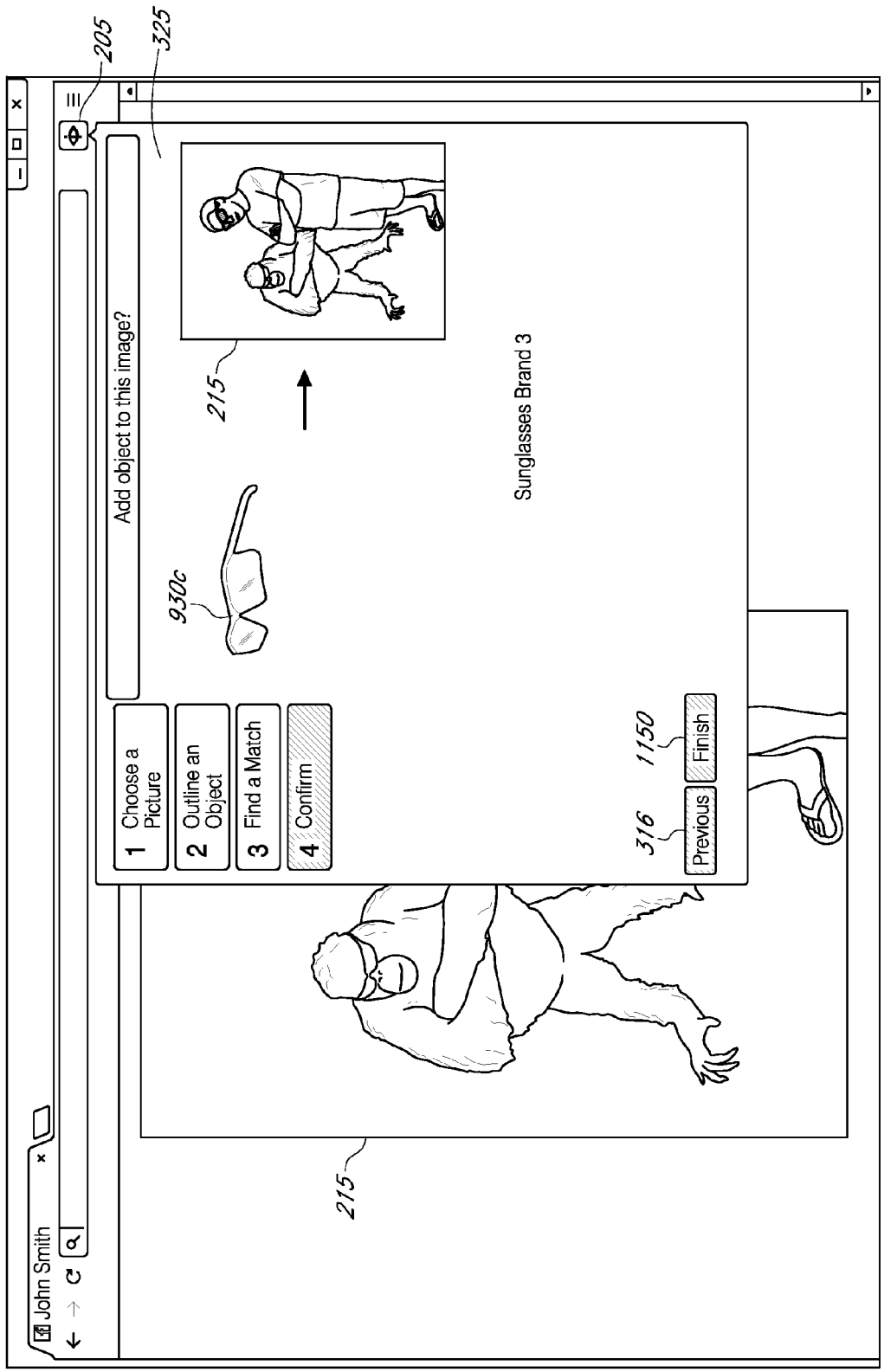
FIG. 10 is an exemplary screen display where the user can confirm that the item selected should be associated with the region defined by the user.

FIG. 10 is an exemplary screen display of a user selecting an item from the list of search results which in this case match the object 615 defined at the object creation node 102 and depicted in FIG. 6. As shown, the item 930c selected contains a black border surrounding the image after the selection, however other means of highlighting or visual cues that indicate that the item 930c has been selected from the search results are possible. In some embodiments, the object creation software may display a page where a user can confirm that the item selected from the search results should be associated with the object 615 defined in the image. FIG. 10 is an exemplary screen display where a user can confirm that the item 930c selected should be associated with the object 615 highlighted by the user on the image 215. As shown, the user may select the "Finish" button 1150 on the pop-up window 325 to complete the process.

During and/or after the above described process, the object creation node 102 transmits one or more numerical values defining the object (e.g. the ordered sequence of (x,y) coordinates created when defining the object), the network resource identifier (e.g. URL) of the image 215 associated with the object 615 from the HTML code reference in the original retrieved web page, and the identity of the item associated with the object, to the object server node 125. The object creation node 102 may also send the height and width of the image as rendered in the web page containing the image downloaded by the object creation node (which may be different from the height and width of the image as stored at the network resource identifier of the image). The object server node 125 may retrieve or generate a network resource identifier for a network resource on an object destination node 105 that is related to the item selected. As another alternative, the object creation node 102 may be used directly to specify a desired network resource identifier on an object destination node 105 to associate with the object, and send it to the object server node 125 as part of this process.

This network resource identifier, whether retrieved or generated by the object server node 125 or the object creation node 102, is referred to herein as the object destination. When the information is received from the object creation node 102, the object server node 125 then creates entries in the object/destination database 130 associating the network resource identifier for the image, the numerical object definition, and the object destination.

As object creation nodes 102 are used to define objects in images, the object server node 125 continues to populate the object/destination database 130. This process may involve determining whether the image that an object creation node 102 has defined an object in already exists in the object/destination database 130 in association with another object. To facilitate this searching process, the object server node 125 may create fixed length hashes (e.g. MD5, SHA-256, and the like) of image data and/or image location data and store the hashes in the database 130. For example, when the object server node 125 receives a network resource identifier of an image which has been used to create an object with an object creation node 102, the object server node 125 may create a hash of the received network resource identifier and search the database 130 for the same hash. If a matching hash isn't found, the object server node 125 may then use the received network resource identifier for the image to access the image data itself over the network 101 and retrieve the image pixel data and associated header data from that location. From the image pixel data, the object server node 125 may calculate an image hash, and search the database again for the same image hash. If it isn't found, the object server node 125 may create a new row in an image information database table, where each row may include an image identification number, the image hash, the image network resource identifier hash, and image size information in pixel height and width obtained from the retrieved image header data. A date/time stamp may also be in the row, as well as the unhashed image network resource identifier. It will be appreciated that creating hashes of the image data is not the only way to compare images to see if they are the same. A variety of image similarity algorithms are available that characterize image content in manner that facilitates comparisons and decisions about whether two images can be considered the same or not. Any such algorithm could be used as an alternative to the hashes described herein.

The object server node 125 may also include in the object/destination database 130 an object information database table. When the object server node 125 receives the numerical information defining the object within the image and receives or generates the object destination, a new row in this table may be created, where each row may include an object identification number, the hash of the image data the object is defined in, the object destination, and the numerical (x,y) coordinate information defining the shape and position of the object within the image.

Once these entries have been stored in the database 130 of the object server node 125, object navigation nodes 106 running object navigation software 107 may interact with the object server node 125 to view and interact with the object 615 when they access a web page that contains the image 215, and to use the object 615 to access the network resource stored at the object destination. User interaction when performing these function is illustrated in FIGS. 11-13.

Figure 11:
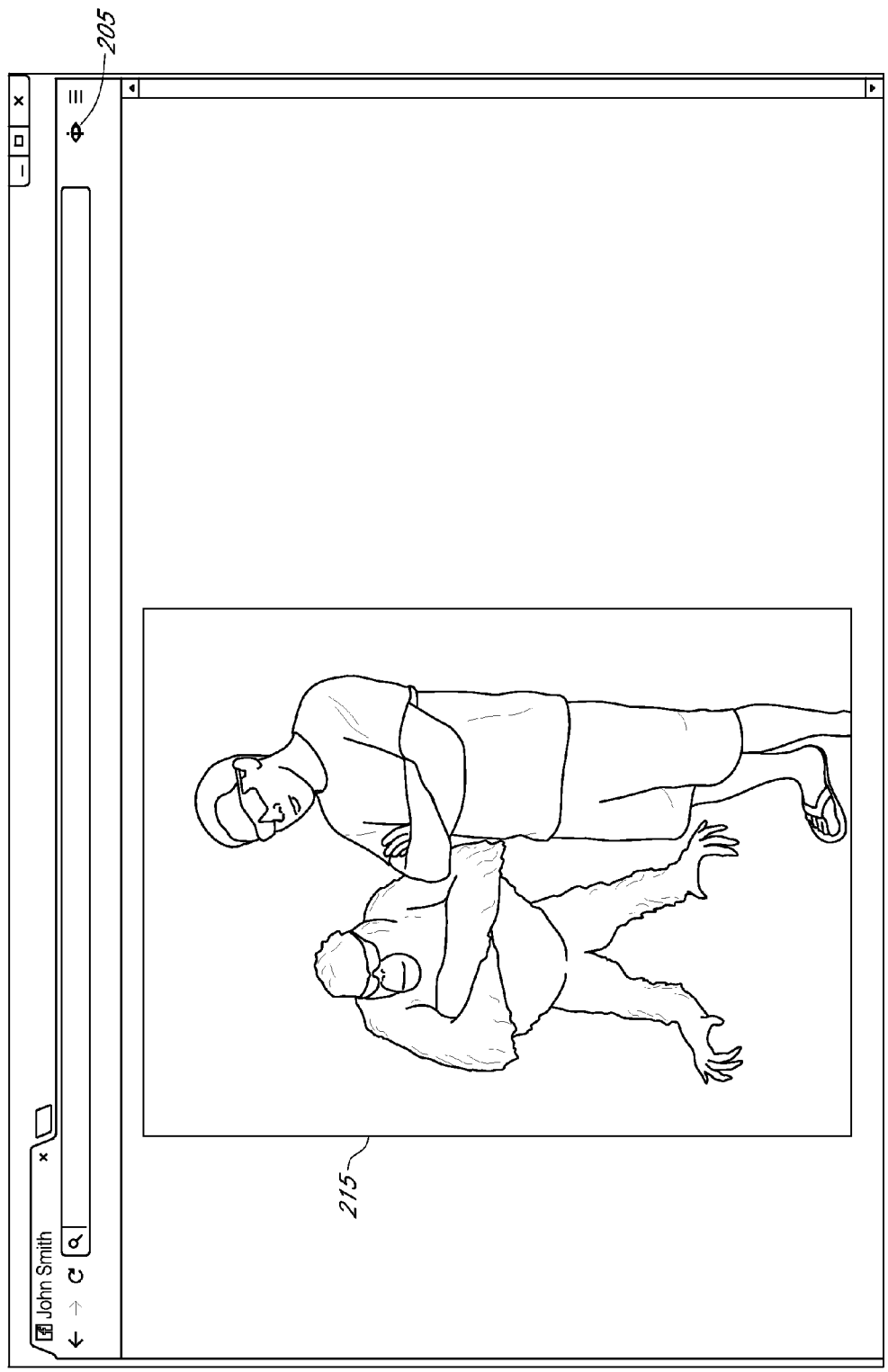
FIG. 11 is an exemplary screen display of a web page that has the image of FIG. 2 including the region of FIG. 6 within it.

FIG. 11 is an exemplary screen display of the web page of FIG. 2, which has now been retrieved and displayed by the browser at the object navigation node 106. When the browser at the object navigation node 106 retrieved this web page, advantageously when it retrieves any web page, not just this one, the object navigation software parses the web page syntax (searching for img tags in the HTML code for example) and finds the network resource identifiers for images to be displayed by the browser when executing the web page. The object navigation node 106 sends these network resource identifiers to the object server node 125. The object navigation node 106 may also send the height and width of the image as rendered with the web page downloaded by the object navigation node 106, which may be different from the image as stored at the network resource identifier of the image, and may also be different from the height and width of the image used at the object creation node 102 when defining the object. The object server node 125 searches the object/destination database 130 for image network resource identifiers (or hashes thereof) matching the image network resource identifiers (or hashes thereof) received from the object navigation node 106. In the case where the HTML code of the web page loaded by the object navigation node contains the URL for the image 215, a match will be found, and the object server node 125 will retrieve the numerical values defining the object with data defining, at least in part, browser functionality that is to be invoked during user interaction with the object. This data may include a network resource identifier that the object navigation software at the object navigation node 106 may use to create a link and link indicator that is associated with the object. This data may also indicate that when the user positions the cursor over image pixels corresponding to the object, the pixels corresponding to the object change color, are outlined, or some other visual cue indicating the object be presented, although this functionality may be pre-programmed into the object navigation software to be used every time object definition data is received from the object server node 125 rather than sent with the object definition data. If the height and/or width of the image as displayed on the object navigation node 106 is different from the height and/or width of the image that was used to define the numerical object coordinates at the object creation node 102, the object server node 125 can scale the numerical object coordinates in the database appropriately using the information regarding the sizes of the image as rendered on the object creation node 102 and the object navigation node 106.

Figure 12:
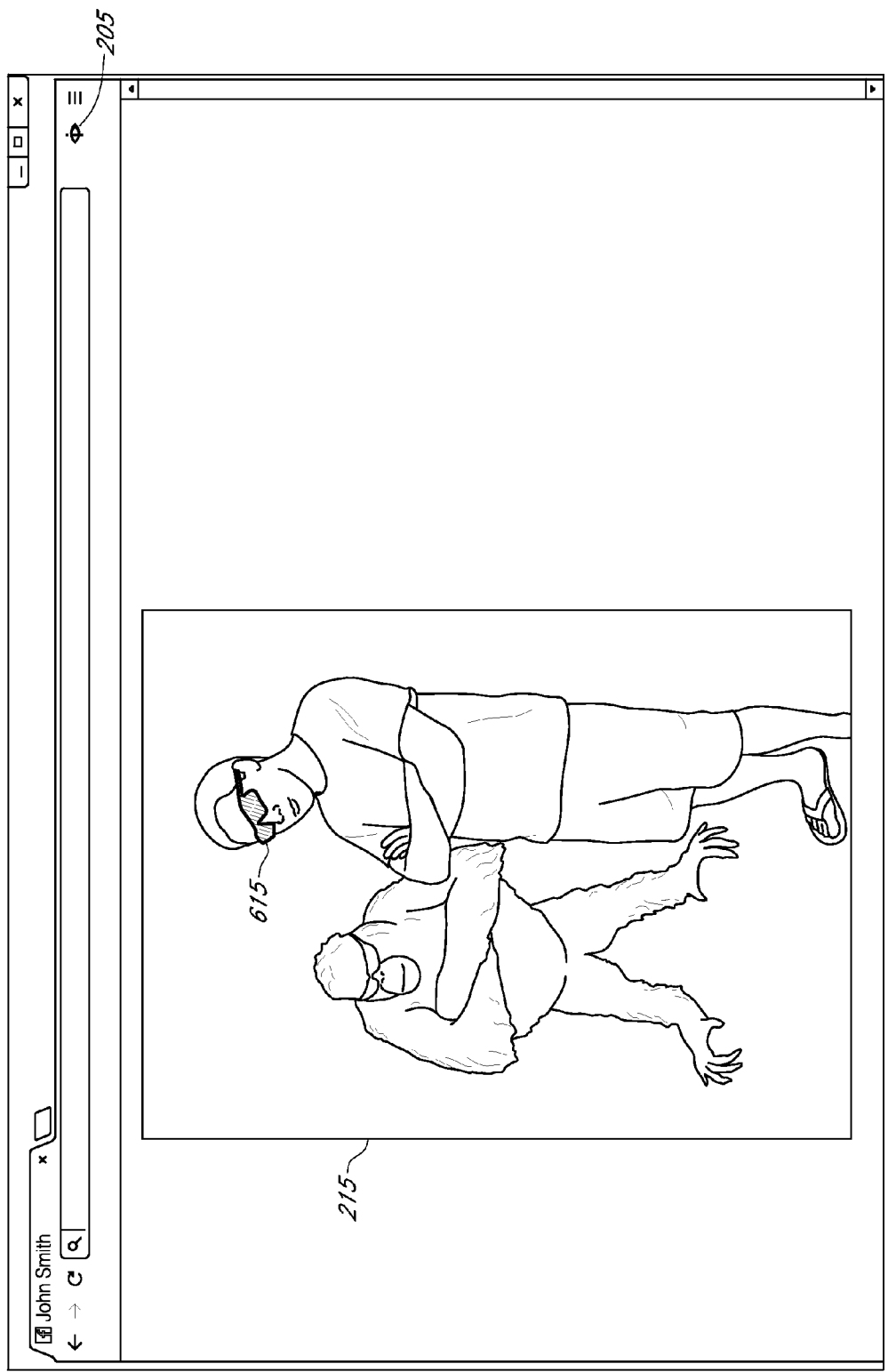
FIG. 12 is an exemplary screen display of the web page depicted in FIG. 11 when a link indicator is displayed.

FIG. 12 is an exemplary screen display of the web page depicted in FIG. 11 when the user has either hovered the cursor over the object 615 or pressed a designated key or key combination which highlights the object 615 within the image 215. As shown in FIG. 12, the user is given a visual cue as a link indicator which indicates that the user is able to interact with the object 615 depicted. In this embodiment, the user may have hovered over the sunglasses depicted in the image 215 and the sunglasses have been highlighted by changing color which indicates the presence of the object 615 within the image 215. If the user clicks on the highlighted object 615 (e.g., the sunglasses) or otherwise selects the object 615 (e.g., presses "Enter") the browser will execute the link containing the network resource identifier that the object server node 125 sent to the object navigation node 106 with the numerical object definition data, and the browser will access the network resource associated with the network resource identifier in that link. The network resource identifier sent by the object server node 125 to the object navigation node 106 and used in this link may direct the browser directly to the object destination, but for tracking purposes, it is advantageous for this network resource identifier to direct the browser to a network resource provided as part of a navigation controller 132 at the object server node 125. In this case, when accessed by the object navigation node 106 by executing the link, this network resource at the object server node 125 may receive and store an identification of the object clicked on, such as the object identification number, in an object interaction log 134. The object identification number may be part of the link network resource identifier previously sent to the object navigation node 106, and which is returned in the access request received by the object server node 125 when the link is executed at the object navigation node 106. In response to the access request from the object navigation node 106, this network resource at the object server node 125 may further send a redirection response to the object navigation node 106 which contains the object destination retrieved from the database 130 that corresponds to the object clicked on as defined with the object creation node 102. Upon receiving the redirection response, the object navigation node 106 issues an access request for the network resource identified by the object destination in the redirection response.

Figure 13:
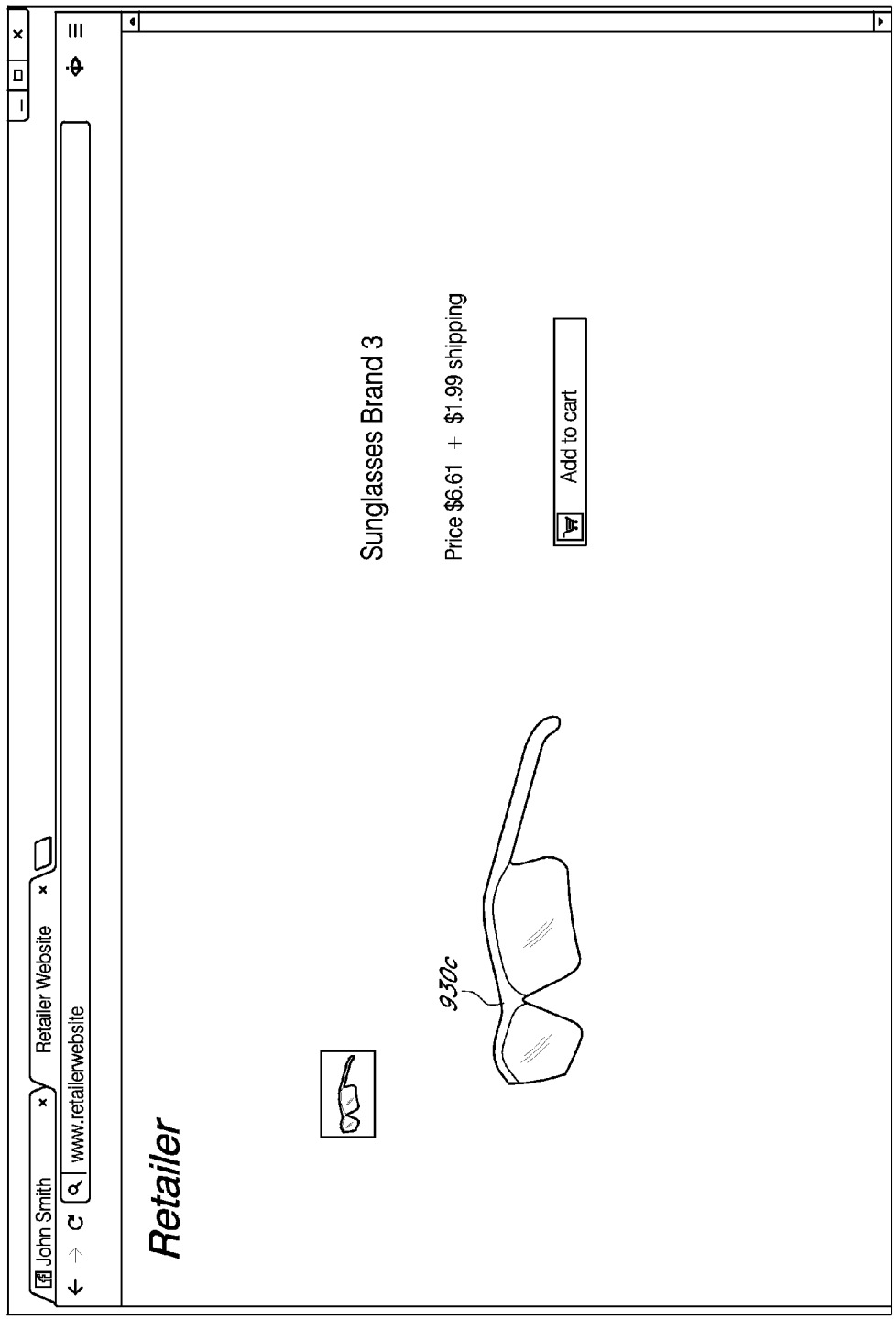
FIG. 13 is an exemplary screen display of a website that the user may be directed to after the user interacts with the link indicator in FIG. 12.

FIG. 13 is an exemplary screen display of a web page that the user may be directed to with the redirection response from object server node 125 after the user has clicked on the object 615 in FIG. 12 and the above described process has been carried out.

Figure 1B:
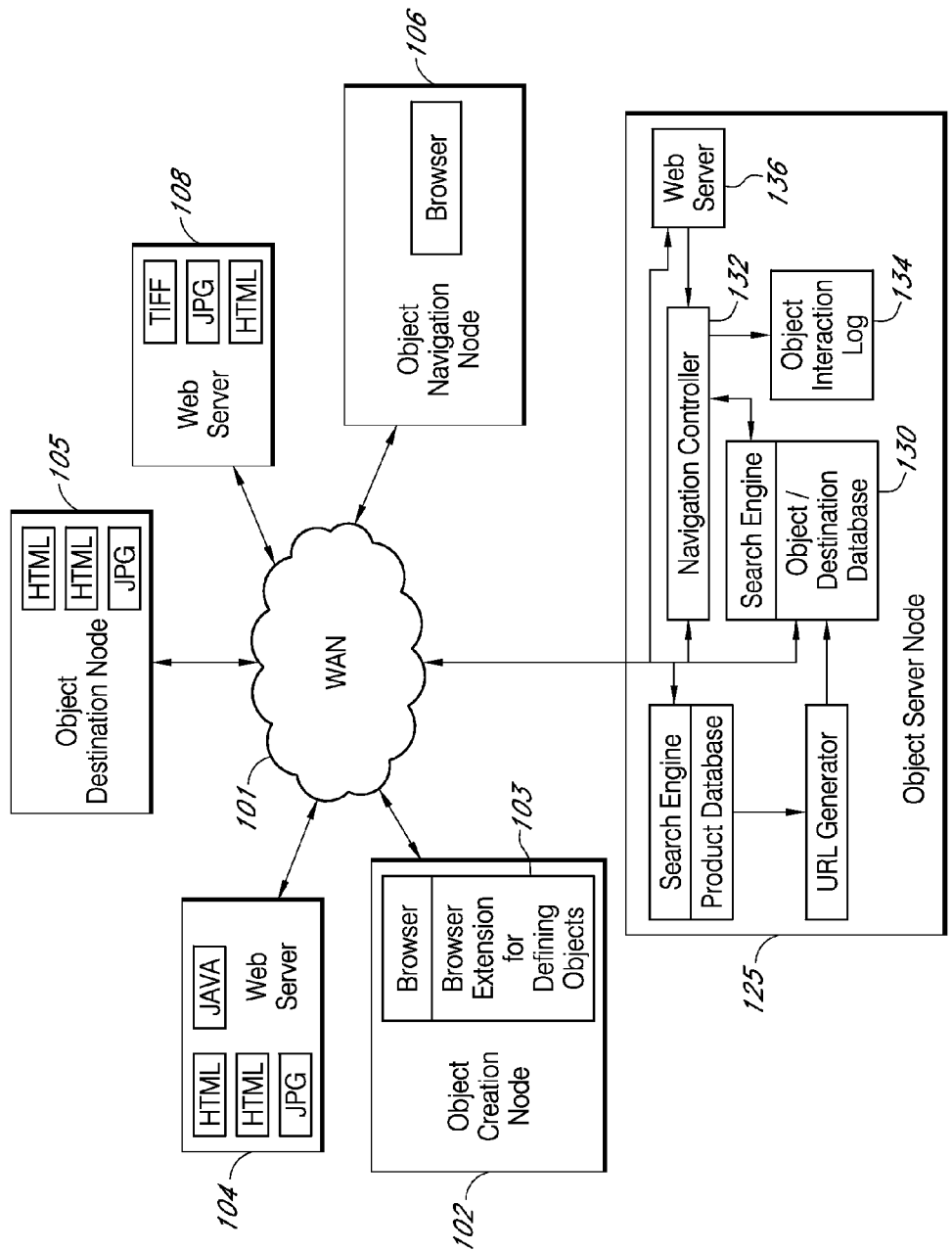
FIG. 1B is a diagram of another exemplary networked communication system in accordance with embodiments described herein.

FIG. 1B illustrates system sharing many similarities to that described above with reference to FIG. 1A, but in this embodiment, the object server node 125 also includes a web server 136. In this embodiment, the object server node 125 may host a social media web site such as Facebook or Pinterest for example. A user of such a social media web site at an object creation node 102 may create objects in images on their personal pages as described above. A user of the same social media web site at an object navigation node 106 may retrieve this page from the web server 136. The web server 136 can communicate with the navigation controller 132 to receive and incorporate objects and associated links defined by the object creation node 102 into the web pages served to the object navigation node 106 before or during the process of serving the pages to the object navigation node 106. This eliminates the need for a browser extension at the object navigation node 106 that parses retrieved web pages (e.g. from other web servers such as web servers 104 and/or 108) for image network resource identifiers and sends them to the object server node 125 for obtaining objects and object destinations. In this embodiment, of course, only web pages retrieved from web server 136 will incorporate objects in their images at the object navigation node 106.

Figure 14:
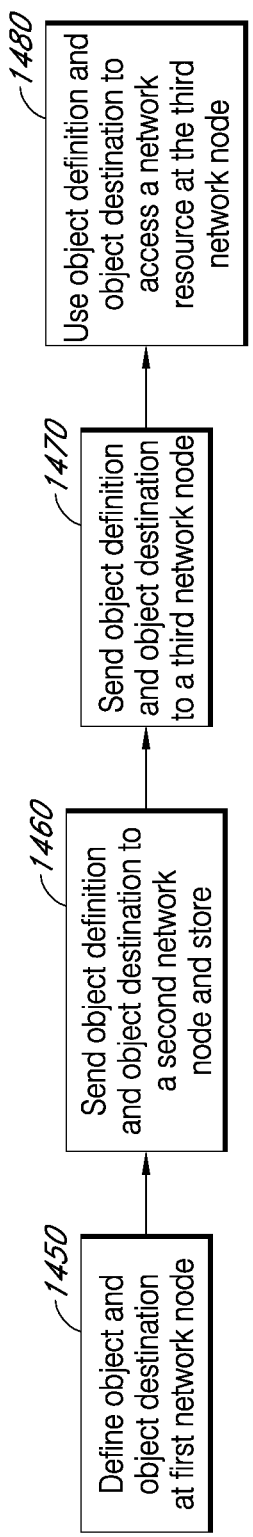
FIG. 14 is an exemplary flowchart of a method performed by the systems of FIGS. 1A and 1B.

FIG. 14 is a flowchart illustrating the functions that may be performed by the systems of FIGS. 1A and 1B. In block 1450, an object and an object destination are defined at a first node of a network. In block 1460, data defining the object and the object destination is sent to a second, different node of the network and the data defining the object is stored at the second node in association with the object destination. In block 1470, the data defining the object and the associated object destination are sent to a third, different node of the network. In block 1480, the third, different node uses the object destination to access a network resource.

Figure 15A:
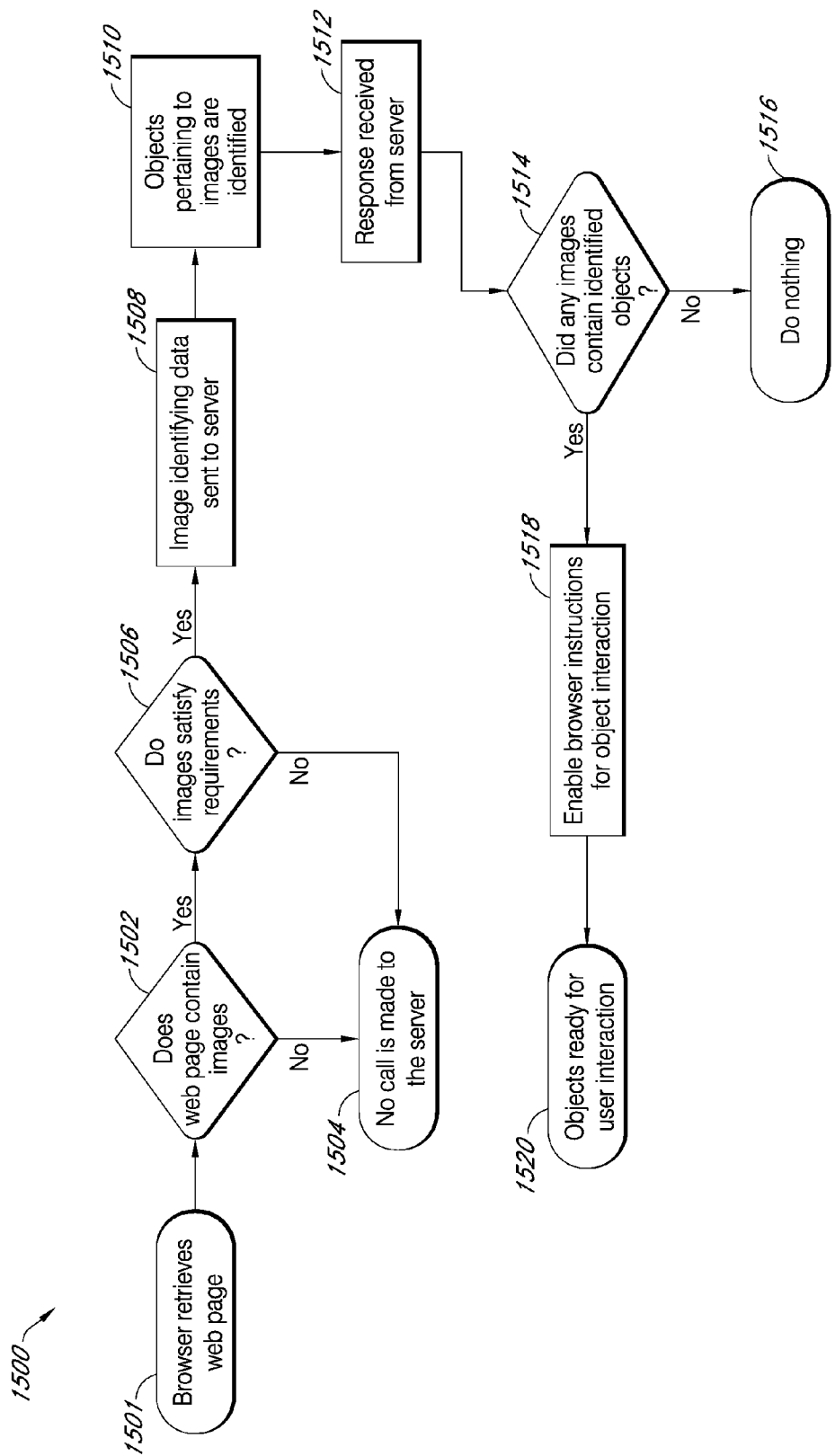
FIG. 15A is an exemplary flowchart of a method of executing image based navigation behavior.

FIG. 15A is an exemplary flowchart of a method 1500 of interaction between the object server node 125 and an object navigation node 106. In block 1501 the method begins when the browser of the object navigation node retrieves a web page. In block 1502, the object navigation node parses the web page syntax to see if the web page contains any images. If no, at block 1504, no call is made to the server. If the web page does contain images, in block 1506 the object navigation node 106 may check to see if the images satisfy specified requirements. For example, the object navigation node 106 may check the web page syntax to determine if the size of the image, the type of image, or other image requirements are satisfied. If not, for example if all displayed images are too small to adequately contain objects, then the method proceeds to block 1504 and no call is made to the server. If the image does satisfy the requirements, then in block 1508, the object navigation node sends image identifying data to the object server node 125. In some embodiments, the image identifying data are or include the image URLs (and possibly also the rendered image size in the retrieved web page) as discussed above, but it is possible that other identifying data could be used, for example, data derived from the image data itself. In block 1510, objects pertaining to the images are identified by the server. In block 1512, a response is received from the server regarding any identified objects within any of the images. In block 1514, the method continues with the object navigation node processing the response to determine if any images of the web page contained any identified objects. If no, in block 1516 no further action is taken. If any of the images did contain any identified objects, then in block 1518 the object navigation software enables instructions for browser functionality to be implemented when identified objects are interacted with. In block 1520, after the instructions are generated, the images are ready for user interaction.

Figure 15B:
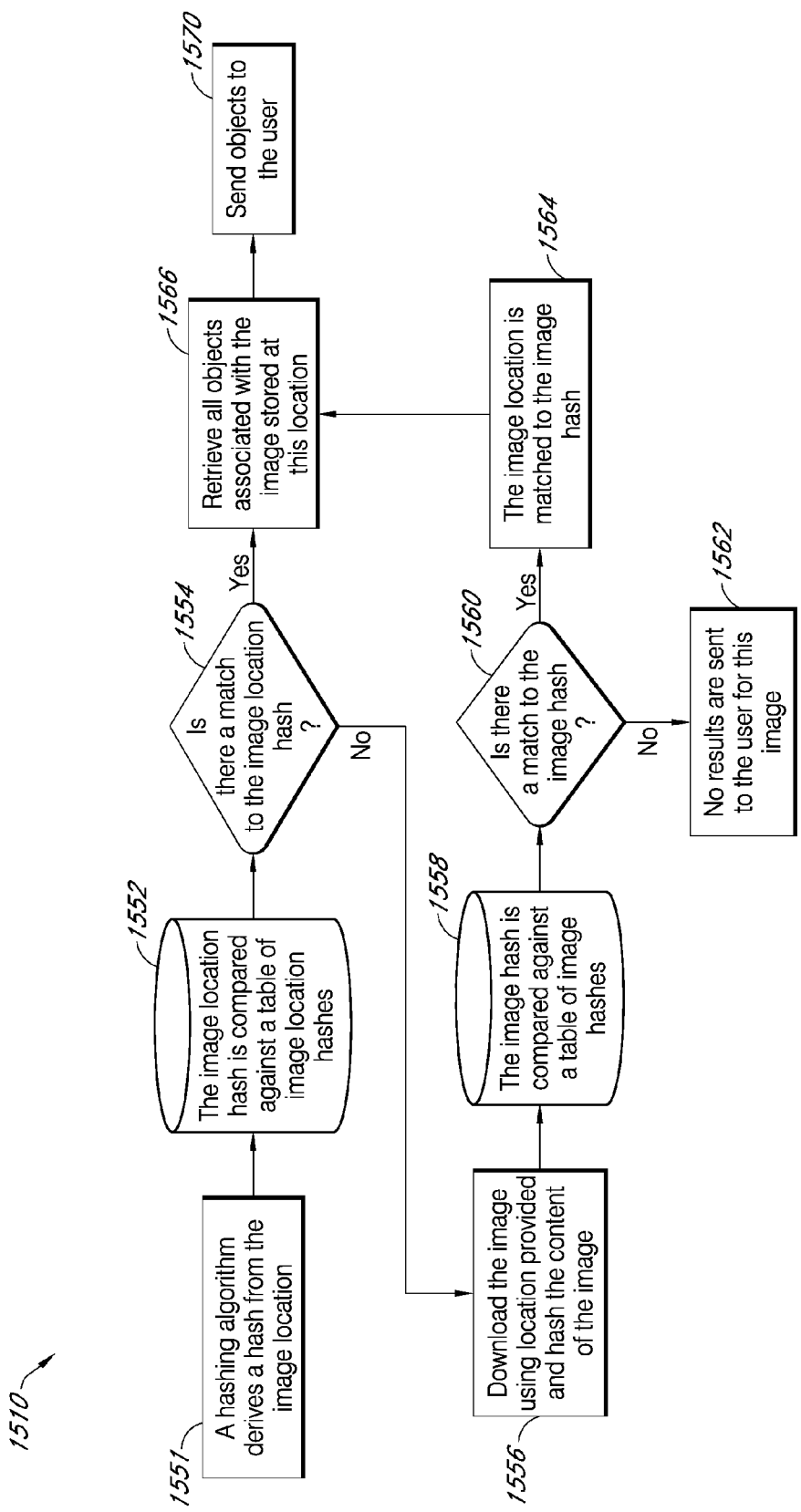
FIG. 15B is an exemplary flowchart of a method of retrieving data defining image regions within an image in response to client identification of an image.

FIG. 15B is an exemplary flowchart of acts that may be performed within the block 1510 of FIG. 15A when the object server node 125 receives image locations (e.g. URLs) from the object navigation node 106 and checks for associated objects. In block 1551, after image identifying data is sent to the server and a request is made to the server to return objects related to one or more images (e.g., block 1508), the object server node 125 may utilize a hashing algorithm to derive a hash from the image location. In block 1552, the object server node 125 then compares the image location hash to image location hashes stored in the object server node 125. In some embodiments, the table of image location hashes are stored in a database of the object server node 125 (e.g., object/destination database 130 of FIG. 1A).

In block 1554, the object server node 125 then determines whether there is a match between the image location hash value (e.g., location hash) to an image location hash value (e.g., location hash) in the table. If there is a match, then the object server node 125 proceeds to block 1566 to retrieve all objects associated with the image at this location. This may be done by retrieving the image hash stored in association with the matching location in the above mentioned image information database table, and searching the above mentioned object information database table for all object entries associated with the same image hash. This helps ensure that complete object identification is made in the event that the same image is located at more than one location, and different object creation nodes 102 create objects in the same image but that were retrieved from different locations by the object creation nodes 102. If there is no match with the received locations (or hashes thereof), then in block 1556 the object server node 125 downloads the image using the location received from the object navigation node 106 and hashes the pixel data of the image. In block 1558, the image hash is compared against a table of image hashes (e.g., the image information database table). At block 1560, the object server node 125 determines whether there is a match between the image hash and an image hash value in the table of image hashes. If there is not a match, then in block 1562, no results (e.g., objects) are sent to the user for this image. If there is a match, then in block 1564, the image location is matched to the same image hash, for example, by creating new entries in the image information database table associating the received new location with the image hash at that location. In block 1566, the server retrieves all objects associated with that image, by, for example, searching the object information database table for all objects associated with that image hash. After the object server node 125 retrieves all the objects, at block 1570, the object server node 125 sends the objects and any associated instructions to the object navigation node 106.

In some embodiments, the object server node 125 can periodically curate the object/destination database 130. For example, if a date/time stamp is associated with an image hash and URL where that image is stored, once a defined length of time passes, the object server node 125 can access the stored URL, re-hash the image stored there, and compare that new hash to the existing stored hash. If there is a match, the same image is still stored at the same location, and the date/time stamp can be updated according to the time the image location was checked for any change. If the new hash does not match, that URL can be removed from the database as stale. It will also be appreciated that a wide variety of types of database organizations can be used for the object/destination database to store and retrieve objects associated with images.

Figure 16A:
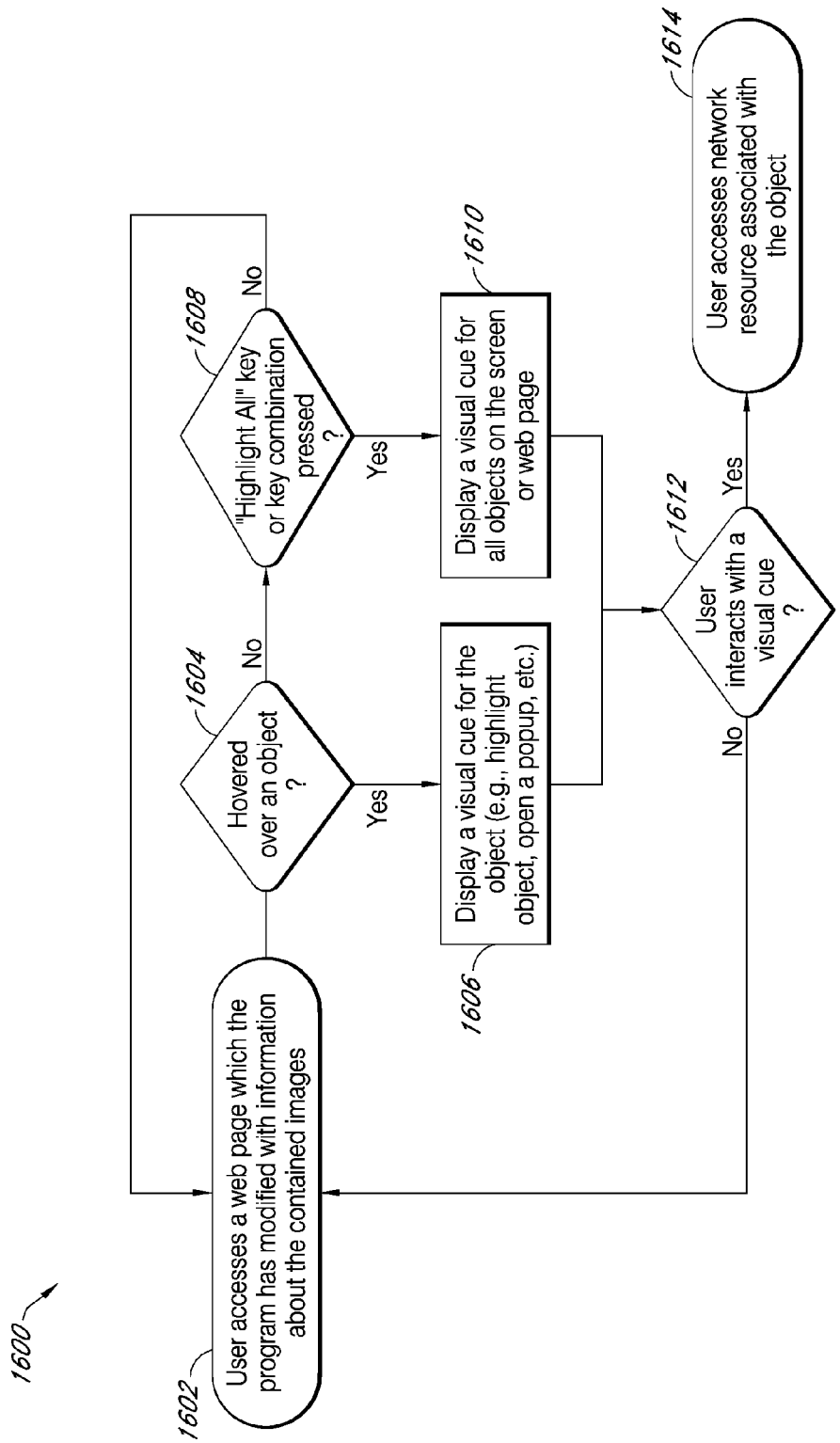
FIG. 16A is a flowchart of an exemplary method of interacting with an object.

FIG. 16A is a flowchart of an exemplary method 1600 of interacting with an object within an image of a webpage. The method begins at block 1602 when a user accesses a web page with an image that contains defined objects. At block 1604, the object navigation software determines whether the user has hovered over a defined object with a mouse cursor. In some embodiments, the object navigation software 107 may receive object definitions from a server (e.g., object server node 125) which contain instructions of how the objects should interact with the user. If the user has not hovered over a defined object, the method proceeds to block 1606 where the object navigation software determines whether a "highlight all" key or key combination is pressed. Referring back to block 1604, if a user has hovered over an object, then in block 1608 the object navigation software displays a visual cue for the object. For example, the objects may appear highlighted on the screen, a pop-up window may open on the screen, or any other visual cue may appear to indicate to the user that an object (e.g., object 615) is defined within the image (e.g., image 215). Returning to block 1606, if no "highlight all" key or key combination is pressed, the method returns to block 1602 and waits for the user to access a new page with images containing defined objects. If the "highlight all" key or key combination is pressed, the method proceeds to block 1610 and the object navigation software displays a visual cue for all objects within the images on the web page. As described with respect to block 1608, the visual cue may comprise highlighted objects, a pop-up window, or other visual cue. In block 1612, the browser extension determines whether the user has interacted with the visual cue. In some embodiments, the interaction may comprise clicking on the highlighted object or pressing a key on the keyboard. If the user has interacted with the visual cue, then in block 1614 the user accesses the network resource associated with the object.

Figure 16B:
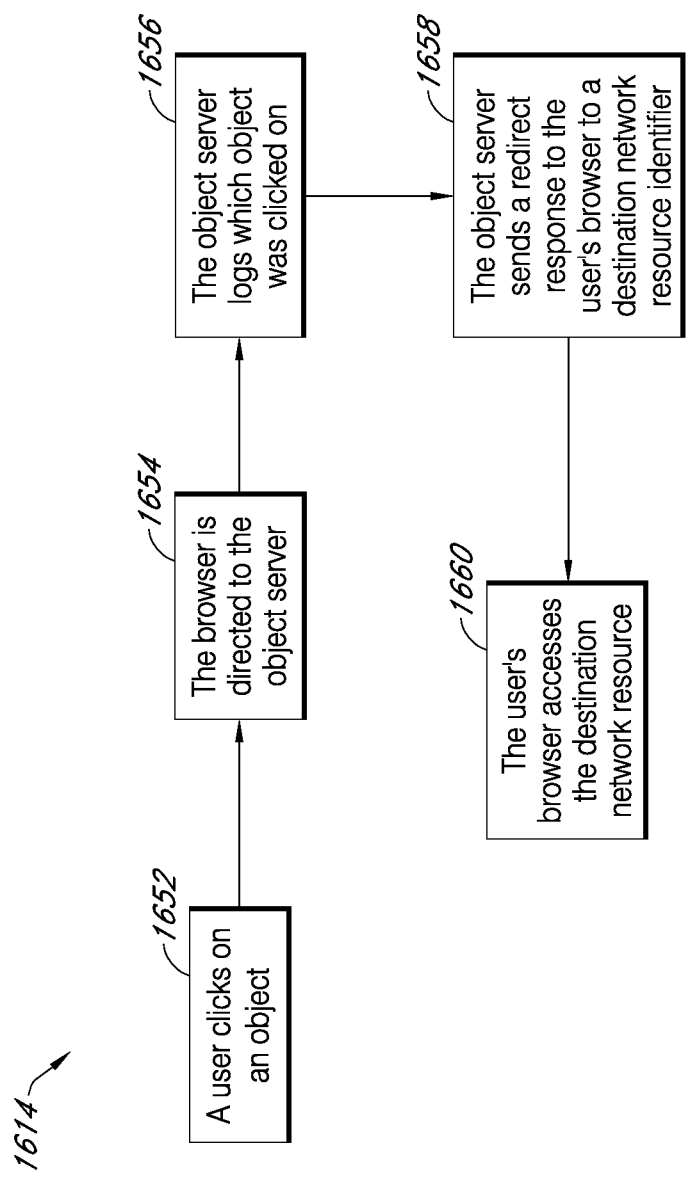
FIG. 16B is a flowchart of one portion of the exemplary method of interacting with object within an image of a web page shown in FIG. 16A.

FIG. 16B is a flowchart of the actions that can be performed within block 1614 of FIG. 16A. At block 1652, a user clicks on an object on a web page. At block 1654, the browser is directed to the object server node 125. At block 1656, the object server node 125 logs which object was clicked on. The object server node 125 logs this information to facilitate crediting the interaction of the object to the object creator. At block 1658, the object server node 125 sends a redirect response to the user's browser to a destination network resource identifier. At block 1660, the user's browser accesses the destination network resource.

The above described systems are useful because they allow an Internet user to insert links within images, and to define at least a location of the link indicator associated with the link. This may be done without controlling the HTML code or any other part of the syntax that defines the web page itself. In some cases, the creator of the link need not have any relationship at all with the creator of the original web page. In some cases, links can be associated with images without reference to any specific web page that loads the image. Such a link can appear when any web page that loads the image is retrieved.

One especially advantageous use of the above system relates to online retail affiliate programs. Online retailers (e.g., Amazon.com, Walmart.com, Target.com, etc.) may allow third-party website operators to advertise and offer for sale on web pages of their website some or all of the goods sold by the online retailer as an "affiliate" of the online retailer. Web pages of a third-party website where a product is described, commented on, advertised, or the like will contain links that access web pages maintained by the online retailer from which the products can be purchased. When a consumer navigates their browser to a web page of the third-party website, sees the advertisement, description, commentary, or the like and decides to purchase that product, they utilize the link provided with that page, which will direct their browser to the web page maintained by the retailer from which the product can be purchased and/or which contains a link or links to the order and fulfillment pages of the retailer website so that the consumer can pay the online retailer for the product and have the product delivered to them by the online retailer. As an affiliate of the online retailer, the owner of the third-party website from which the consumer navigated to the online retailer website to purchase the product receives a commission on the sale from the online retailer.

In order to track which affiliate was the source of a consumer navigation to the online retailer website that resulted in a purchase from the online retailer, each affiliate uses particular URLs in the link syntax on their web pages in association with their advertisements, descriptions, commentaries, and the like. These URLs, which may be referred to as retail affiliate URLs, may include an affiliate identifier or one of a set of affiliate identifiers (as all or part of the URL query string for example) that are different for each affiliate, which the online retailer logs when a consumer retrieves the online retailer web page after clicking on the third-party link that includes the affiliate identifier within it. The online retailer ties this affiliate identifier in the URL received when the web page was requested to the sale transaction made with the consumer, allowing the online retailer to track to whom any commission due should be sent. This arrangement is profitable to both the online retailer and the third-party website owner. The online retailer increases sales by leveraging third-party advertising, and the third-party website owner receives payment from the online retailer for business it drives to the online retailer.

The above systems and methods can expand the reach of these affiliate programs to provide effective affiliate status to third-parties that are not themselves affiliates of the online retailer. In this use of the above systems and methods, the object server node 125 may be operated by an affiliate of an online retailer, the item selected by the object creation node 102 may be a product sold by this online retailer, and the object destination may be a retail affiliate URL that accesses a network resource of the online retailer where the product can be purchased (such as is shown in FIG. 13, for example. Referring again to FIG. 13, if the operator of the object navigation node 106 purchases the item 930*c* (e.g., sunglasses) from the online retailer via the web page of FIG. 13, the operator of the object creation node 102 that created the object 615 may receive a commission or fee as a result of the purchase. When the URL in the redirection response is a retail affiliate URL containing the affiliate identifier of the operator of the object server node 125, the online retailer will pay a commission on the sale of the sunglasses to the operator of the object server node 125. Part of this commission can be paid to the operator of the object creation node 102 that created the object 615. The identity of the object creation node 102 that created the object can be obtained since the object server node 125 logged the identity of the object 615 clicked when the object navigation node executed the link back to the network resource on the object server node 125 associated with the object 615, and can therefore identify the operator of the object creation node 102 responsible for that sale. In some cases, the operator of the object server node 125 may receive reward points, cash back, gifts, offers, discounts, etc. instead of, or in addition to, the commission or fee from the affiliate program. The creator of the browser extension or the website owner may then also pass along some of the benefits (e.g., reward points or gifts) to the appropriate operator of an object creation node 102.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. A server in communication over a network with at least a first and a second client, the server being configured for providing the first client with control over at least some aspects of network resource navigation behavior of the second client, the server comprising:
    a database having stored therein:
        data identifying at least a first image;
        data defining a region of the first image, wherein the region of the first image is selected at the first client and is received by the server from the first client; and
        a network resource identifier stored in association with the data defining the region of the first image;
    a navigation controller configured to control the navigation behavior of the second client using the data defining the region of the first image and the associated network resource identifier, wherein, when the second client accesses the first image from a node of the computer network, the navigation controller is configured to:
        obtain data identifying the first image;
        retrieve from the database data defining the region of the first image using the obtained data identifying the first image;
        send data defining the region of the first image to the second client; and
        send the network resource identifier that is stored in the database in association with the data defining the region of the first image to the second client.

2. The server of claim 1, wherein the data identifying the first image comprises one or more values derived from the image data of the first image.

3. The server of claim 1, wherein the data identifying the first image comprises a network resource identifier or a hash of a network resource identifier at which the first image is accessible to nodes of the computer network.

4. The server of claim 1, wherein the navigation controller is configured to:
    obtain an image URL for the first image from the second client when the second client accesses the first image from a node of the computer network;
    search the database for a matching image URL for the first image;
    retrieve the data defining the region of the first image defined by the first client;
    send the data defining the region of the first image to the second client; and send a URL of a network resource hosted by the server to the second client.

5. The server of claim 4, wherein the network resource hosted by the server is configured to:
record at least some information contained in requests by the second client to access the network resource hosted by the server; and
send the network resource identifier that is stored in the database in association with the data defining the region of the first image to the second client.

6. The server of claim 5, wherein the network resource identifier that is stored in the database in association with the data defining the region of the first image is a URL of a web page stored by a third node of the network.

7. The server of claim 6, wherein the navigation controller is configured to send the URL of the web page as part of a redirection response sent in response to a request from the second client to access the network resource hosted by the server.

8. The server of claim 1, further comprising a database storing network resource information.

9. The server of claim 8, further comprising a search engine configured to search the database of network resource information in response to receiving a search request from the first client.

* * * * *